United States Patent
Ashworth et al.

(10) Patent No.: US 11,538,607 B2
(45) Date of Patent: *Dec. 27, 2022

(54) CONDUCTOR SYSTEMS FOR SUSPENDED OR UNDERGROUND TRANSMISSION LINES

(71) Applicant: VEIR, Inc., Boston, MA (US)

(72) Inventors: Stephen Paul Ashworth, Gallicano (IT); Franco Moriconi, Berkeley, CA (US); Timothy David Heidel, Alexandria, VA (US)

(73) Assignee: Veir, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,741

(22) Filed: May 23, 2022

(65) Prior Publication Data

US 2022/0277873 A1    Sep. 1, 2022

Related U.S. Application Data

(63) Continuation of application No. 17/524,267, filed on Nov. 11, 2021, now Pat. No. 11,373,784.

(60) Provisional application No. 63/115,348, filed on Nov. 18, 2020.

(51) Int. Cl.
  *H01B 12/00*    (2006.01)
  *H01B 12/16*    (2006.01)
  *H01B 7/42*    (2006.01)

(52) U.S. Cl.
  CPC ............. *H01B 12/16* (2013.01); *H01B 7/423* (2013.01)

(58) Field of Classification Search
  CPC .................................. H01B 12/16; H01B 7/42
  See application file for complete search history.

(56) References Cited

U.S. PATENT DOCUMENTS

| 817,389 A | 4/1906 | Reynolds |
|---|---|---|
| 3,562,401 A | 2/1971 | Long |
| 3,646,243 A | 2/1972 | Graneau et al. |
| 3,694,914 A | 10/1972 | Aupoix et al. |

(Continued)

FOREIGN PATENT DOCUMENTS

| EP | 3051542 A1 | 8/2016 |
|---|---|---|
| GB | 1499384 A | 2/1978 |

(Continued)

OTHER PUBLICATIONS

Partial Search Report issued for PCT/US2021/058928, dated Feb. 25, 2022.

(Continued)

*Primary Examiner* — Pete T Lee
(74) *Attorney, Agent, or Firm* — Cooley LLP

(57) ABSTRACT

A conductor assembly for transmitting power includes a former that defines a shape, a superconductor material disposed around the former, and a thermally insulating jacket (TIJ) disposed around and spaced apart from the superconductor material. An outer surface of the superconductor material and an inner surface of the TIJ can define an annulus through which a coolant can flow. The conductor assembly can also include an external layer, disposed around an outside surface of the TIJ, to provide structural support to the conductor assembly. The conductor assembly can also include an electrical insulation layer disposed around the outside surface of the TIJ or around the superconductor material.

30 Claims, 7 Drawing Sheets

(56) References Cited

U.S. PATENT DOCUMENTS

| | | |
|---|---|---|
| 3,723,634 A | 3/1973 | Aupoix et al. |
| 3,781,455 A | 12/1973 | Hildebrandt |
| 3,878,691 A | 4/1975 | Asztalos |
| 3,917,897 A | 11/1975 | Hildebrandt |
| 3,950,606 A | 4/1976 | Schmidt |
| 4,947,007 A | 8/1990 | Dew et al. |
| 6,173,577 B1 | 1/2001 | Gold |
| 7,296,419 B2 | 11/2007 | Suzawa et al. |
| 7,358,435 B2 | 4/2008 | Ladie et al. |
| 7,453,041 B2 | 11/2008 | Maguire et al. |
| 7,598,458 B2 | 10/2009 | Yumura et al. |
| 7,614,243 B2 | 11/2009 | Masuda et al. |
| 7,633,014 B2 | 12/2009 | Allais et al. |
| 7,709,742 B2 | 5/2010 | Allais et al. |
| 7,840,244 B2 | 11/2010 | Hirose et al. |
| 7,840,245 B2 | 11/2010 | Hirose |
| 7,953,466 B2 | 5/2011 | Jang et al. |
| 7,979,976 B2 | 7/2011 | Soika et al. |
| 8,091,207 B2 | 1/2012 | Soika et al. |
| 8,112,135 B2 | 2/2012 | Allais et al. |
| 8,134,072 B2 | 3/2012 | Allais et al. |
| 8,214,005 B2 | 7/2012 | Soika et al. |
| 8,275,430 B2 | 9/2012 | Schmidt et al. |
| 8,304,650 B2 | 11/2012 | Stemmle et al. |
| 8,326,386 B2 | 12/2012 | Willen et al. |
| 8,332,005 B2 | 12/2012 | Schmidt et al. |
| 8,369,912 B2 | 2/2013 | Usoskin |
| 8,380,267 B2 | 2/2013 | Soika et al. |
| 8,401,601 B2 | 3/2013 | Soika et al. |
| 8,433,381 B2 | 4/2013 | Choi et al. |
| 8,478,374 B2 | 7/2013 | Maguire et al. |
| 8,588,877 B2 | 11/2013 | Soika et al. |
| 8,594,756 B2 | 11/2013 | Roden et al. |
| 8,623,787 B2 | 1/2014 | Willen et al. |
| 8,670,808 B2 | 3/2014 | Soika et al. |
| 8,688,182 B2 | 4/2014 | Soika et al. |
| 8,748,747 B2 | 6/2014 | Soika et al. |
| 8,798,697 B2 | 8/2014 | Stemmle et al. |
| 8,826,674 B2 | 9/2014 | Usoskin |
| 8,897,845 B2 | 11/2014 | Stemmle et al. |
| 8,923,940 B2 | 12/2014 | Stemmle et al. |
| 8,934,951 B2 | 1/2015 | Schmidt et al. |
| 8,948,831 B2 | 2/2015 | Stemmle et al. |
| 8,954,126 B2 | 2/2015 | Stemmle et al. |
| 9,002,423 B2 | 4/2015 | Jang et al. |
| 9,006,576 B2 | 4/2015 | Stemmle et al. |
| 9,037,202 B2 | 5/2015 | Yuan et al. |
| 9,070,497 B2 | 6/2015 | Stemmle et al. |
| 9,123,459 B2 | 9/2015 | Marzahn et al. |
| 9,159,473 B2 | 10/2015 | Stemmle et al. |
| 9,202,611 B2 | 12/2015 | Stemmle et al. |
| 9,418,777 B2 | 8/2016 | Stemmle et al. |
| 9,496,072 B2 | 11/2016 | Soika et al. |
| 9,646,742 B2 | 5/2017 | Yuan et al. |
| 9,653,196 B2 | 5/2017 | Yuan et al. |
| 9,685,260 B2 | 6/2017 | Marzahn et al. |
| 10,062,478 B2 | 8/2018 | Tamada et al. |
| 10,062,479 B2 | 8/2018 | Stemmle et al. |
| 10,151,521 B2 | 12/2018 | Schippl et al. |
| 11,363,741 B2 | 6/2022 | Ashworth |
| 2005/0079980 A1 | 4/2005 | Mayasuki et al. |
| 2005/0173149 A1 | 8/2005 | Gouge et al. |
| 2006/0150639 A1 | 7/2006 | Zia et al. |
| 2007/0053116 A1 | 3/2007 | Ichikawa et al. |
| 2009/0192042 A1 | 6/2009 | Kim et al. |
| 2009/0170706 A1 | 7/2009 | Hirose et al. |
| 2009/0221426 A1 | 9/2009 | Hazelton |
| 2009/0254227 A1 | 10/2009 | Tsuda |
| 2010/0099571 A1 | 4/2010 | Usoskin et al. |
| 2011/0180293 A1 | 7/2011 | Jang et al. |
| 2013/0150246 A1 | 6/2013 | Willen et al. |
| 2013/0165324 A1* | 6/2013 | Jang ............... H01B 12/16 174/15.5 |
| 2014/0221213 A1* | 8/2014 | Fukuda ............ H01B 12/16 174/15.5 |
| 2015/0080225 A1* | 3/2015 | Nomura ........... H01L 39/02 505/231 |
| 2016/0322129 A1 | 11/2016 | Sunnegardh et al. |
| 2016/0351304 A1 | 12/2016 | Schmidt et al. |
| 2016/0370036 A1 | 12/2016 | Friedhelm |
| 2017/0330653 A1 | 11/2017 | Lee et al. |
| 2018/0166188 A1 | 6/2018 | Arndt et al. |
| 2018/0182513 A1 | 6/2018 | Na et al. |
| 2019/0260194 A1 | 8/2019 | Stemmle et al. |
| 2021/0080153 A1 | 3/2021 | Hildenbeutel |
| 2022/0028583 A1 | 1/2022 | Alekseev |
| 2022/0146563 A1 | 5/2022 | Dong et al. |

FOREIGN PATENT DOCUMENTS

| | | |
|---|---|---|
| WO | WO 2008/018896 A2 | 2/2008 |
| WO | WO 2008/097759 A1 | 8/2008 |
| WO | WO 2008/100702 A2 | 8/2008 |
| WO | WO 2009/120833 A1 | 10/2009 |
| WO | WO 2010/039513 A1 | 4/2010 |
| WO | WO 2014/007903 A2 | 1/2014 |
| WO | WO-2022106131 A1 | 5/2022 |

OTHER PUBLICATIONS

International Search Report and Written Opinion issued for PCT/US2021/058926, dated Feb. 18, 2022.

International Search Report and Written Opinion issued for PCT/US2021/058927, dated Feb. 28, 2022.

International Search Report and Written Opinion issued for PCT/US2021/058928, dated Apr. 20, 2022 (22 pages).

Firsov V.P. et al. "Evaporating system for cryogenic support of long length HTS power cables", International Journal of Hydrogen Energy, Science Direct, vol. 43, No. 29, 2018, pp. 13594-13604.

Honjo et al. "Status of Superconducting Cable Demonstration Project in Japan", IEEE Transactions On Applied Superconductivity, vol. 21, No. 3, 2011, pp. 967-971.

Ashworth et al. "A novel cooling scheme for superconducting power cables," Cryogenics, 2011, vol. 51, p. 161-167.

Los Alamos Science and Technology Magazine 1663, Jul. 2009, 15 pages.

Machine Translation of WO2022/106131A1 (9 pages).

Notice of Allowance issued for U.S. Appl. No. 17/742,708, dated Aug. 22, 2022, 7 pages.

* cited by examiner

CONDUCTOR SYSTEMS FOR SUSPENDED OR UNDERGROUND TRANSMISSION LINES

RELATED APPLICATIONS

This application is a continuation of U.S. patent application Ser. No. 17/524,267, filed Nov. 11, 2021 and titled "Conductor Systems for Suspended or Underground Transmission Lines," which claims priority to and the benefit of U.S. Provisional Patent Application No. 63/115,348, filed Nov. 18, 2020 and titled "Conductor Systems for Suspended or Underground Transmission Lines," the disclosures of which are hereby incorporated by reference herein in their entireties.

FIELD

The present disclosure is related to the field of electricity transmission, and more specifically, to conductor assemblies comprising at least one element containing superconducting materials.

BACKGROUND

Electric power is typically moved from its point of generation to consumer loads using an electric power grid ("the grid"). Electric power grids include components such as power generators, transformers, switchgear, transmission and distribution lines, and control and protection devices.

SUMMARY

Embodiments described herein relate to conductor assemblies for transmitting power. In some embodiments, a conductor assembly can include a former that defines a shape, a superconductor material disposed (e.g., wrapped) around the former, and a thermally insulating jacket (also referred to herein as a thermal insulation jacket) ("TIJ") disposed around and spaced apart from the superconductor material. An outer surface of the superconductor material and an inner surface of the TIJ can define an annulus through which a coolant can flow. In some embodiments, the conductor assembly can include an external layer disposed around an outside surface of the TIJ. In some embodiments, the external layer can provide structural support to the conductor assembly. In some embodiments, the conductor assembly can include an electrical insulation layer disposed around the outside surface of the TIJ. In some embodiments, the electrical insulation layer can be disposed around the superconductor material. In some embodiments, a coolant tube can be disposed in the space. In some embodiments, the coolant tube can transport the coolant. In some embodiments, the coolant tube can include a flow orifice that transports the coolant from the coolant tube to the space. In some embodiments, the flow orifice can include a series of pores or openings. In some embodiments, the flow orifice can include a flow impeder that regulates fluid flow through the flow orifice. In some embodiments, a header tube can be fluidically coupled to the coolant tube. In some embodiments, the conductor assembly can include a sensor and a valve can regulate flow of coolant between the header tube and the coolant tube.

DETAILED DESCRIPTION

Figure 1:
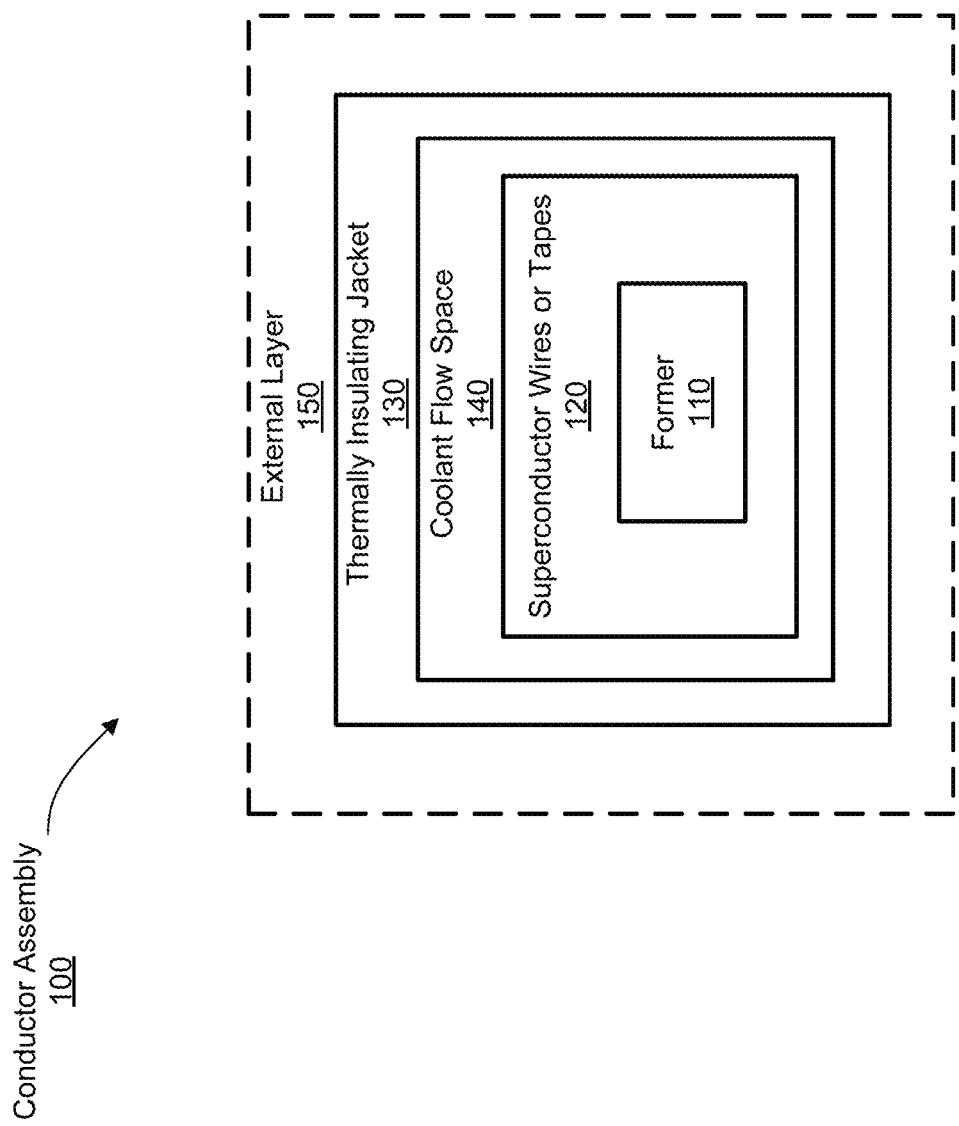
FIG. 1 is a block diagram showing components of an example conductor system for cooled superconducting power lines, such as overhead suspended superconducting power lines, according to an embodiment.

Embodiments described herein relate to conductor assemblies for power transmission, and methods of producing and operating the same. Superconductor cables employed in power transmission systems, as set forth herein, can operate at up to 10 times the current of conventional wire while maintaining superconductivity. Higher current allows for lower voltage and smaller rights-of-way. Additionally, energy can be transferred through power transmission systems at a higher rate through narrow rights-of-way with reduced energy losses, as contrasted with known systems. Moreover, by incorporating active cooling mechanisms into power transmission systems with superconductors, overhead power transmission lines of the present disclosure can exhibit reduced sag and creep and/or more consistent sag and creep over time, and underground power transmission lines of the present disclosure can exhibit more consistent performance, as contrasted with known systems. In other words, power transmission lines of the present disclosure may exhibit sag and/or creep that are not variable, or that do not substantially vary, over time, in view of the actively controlled temperature of the power transmission lines.

Known electric power transmission systems use continuous electrical conductors to interconnect power generation stations with consumer loads. Power generation stations, such as thermal (e.g., steam-driven), nuclear, hydroelectric, natural gas, solar and wind power plants, generate electric energy at AC voltages typically ranging between 15 kV and 25 kV. To transport the energy over long distances, the associated voltage is increased at the power generation station, for example via a step-up transformer. Extra-high-voltage (EHV) power transmission lines can transport the energy to geographically remote substations at voltages of 230 kV and above. At intermediate substations, the voltage can be reduced to high-voltage (HV) levels via a step-down transformer, and the energy is transported to HV substations via power transmission lines that operate at voltages ranging from 220 to 110 kV. At HV substations closer to the loads, the voltage is further reduced to 69 kV, and sub-transmission lines connect the HV substations to the many distribution stations. At the distribution substations, the voltage is reduced to a value in the range of 35 kV to 12 kV before being distributed to the loads at 4160/480/240/120V via pole-top or pad-mounted step-down transformers. The precise voltages used in transmission and distribution vary slightly in different regions and different countries.

In the United States, an EHV power transmission line has a nominal voltage of between 230 kV and 800 kV, and a HV power transmission line has a nominal voltage of between 115 kV and 230 kV. For voltages of between 69 kV and 115 kV, the line is considered to be at a sub-transmission level, and below 60 kV it is considered to be at a distribution level. The voltage values demarcating these designations are somewhat arbitrary, and can vary depending on the authority having jurisdiction and/or the location. Known EHV power transmission lines can transport energy as far as 400-500 miles, whereas HV power transmission lines can transport energy as far as 200 miles, and sub-transmission lines can transport energy for 50-60 miles. High-voltage DC (HVDC) power transmission lines are used to transmit energy over long distances or underwater. In a HVDC system, AC voltage generated by a generator is rectified, and the energy is transmitted via a DC cable to the receiving station, where an inverter is used to convert DC voltage back to AC.

As described above, known electrical conductors are used to form a continuous connection between the generators and the consumer loads (the "load"). The electrical conductors can include bus bars, underground cables, and/or overhead (i.e., physically suspended) lines (both transmission and distribution), as appropriate. Overhead ("OH") power transmission lines are primarily used in open corridors or along wide roads, whereas underground cables may be used in congested areas of densely populated cities. OH transmission systems include, a system of supporting structures such as towers or poles (also referred to as "pylons") that support the electrical conductor above the ground. OH power transmission systems also include dielectric insulators that mechanically connect the conductor to the tower while keeping them electrically isolated from one another and elements to provide electrical ground and mechanical integrity. Elements that provide electrical ground and mechanical integrity can include structural foundations, grounding electrodes, and shield conductors.

In overhead power transmission lines of the present disclosure, each supporting structure can be of one of the following types: (A) pass-through/continuity (i.e., providing continuity of coolant flow and continuity of power transmission, without an auxiliary coolant inlet or outlet, and without performing re-cooling, re-pressurization, or flow control of the coolant); (B) flow supplementing (i.e., providing continuity of coolant flow and continuity of power transmission, and including an auxiliary coolant inlet and/or outlet, but without performing re-cooling, re-pressurization, or flow control of the coolant); (C) coolant processing (i.e., providing continuity of coolant flow and continuity of power transmission, and performing re-cooling, re-pressurization, or flow control of the coolant, but without an auxiliary coolant inlet or outlet); or (D) combination (i.e., providing continuity of coolant flow and continuity of power transmission, with an auxiliary coolant inlet and/or outlet, and performing re-cooling, re-pressurization, and/or flow control of the coolant). OH transmission systems set forth herein can include any combination of supporting structures A, B, C, and D or of subsets thereof. The supporting structures can have any of a variety of designs depending on, among other considerations, the voltage of the power transmission line, the location, and/or the requirements of local governments or other regulatory authorities. Example designs include: lattice or tubular towers, cantilevered or guyed poles and masts, and framed structures. Materials used to fabricate such supporting structures can include, for example: galvanized steel, concrete, wood, plastic and/or fiberglass composite(s).

Conductors for OH power transmission lines can be bare metal (e.g., copper, aluminum, or a matrix of aluminum and steel), or they can be coated or wrapped with an electrical dielectric insulation. Bare metal conductors are less expensive than insulated conductors, and thus are generally preferred in OH power transmission lines. Although aluminum has a lower electrical conductivity than copper, it is more commonly used in OH power transmission lines, due to its lower cost and lighter weight. To increase the mechanical strength of aluminum conductors, steel strands can be introduced into the conductor core, thereby forming a composite conductor. The aluminum conductor steel-reinforced (ACSR) conductor is currently the most common conductor used in OH power transmission lines. Recently, "high temperature, low sag" conductors comprising a matrix of aluminum and composite materials and/or other metals have also been deployed in grids. Dielectrically insulated OH conductors are much more common in the distribution regions of the grid and at lower voltages (e.g., below 25 kV). Underground conductors are typically covered with electrical insulation to prevent electrical contact with other conductors or the ground/soil.

Bare OH conductors, when used in OH power transmission systems, are typically suspended from poles or towers, supported by insulators, and designed to maintain a prescribed minimum clearance with respect to the ground/soil, vegetation, and other structures. Surrounding air is typically the electrical insulation medium employed in bare OH conductor systems. In other words, no additional structures are fixed to bare OH conductor systems. The insulators can be attached to the poles or towers in a variety of different configurations, depending on the type and location of the pole/tower. Insulators can be fabricated from a variety of different materials, such as ceramic, porcelain, glass, and composite(s). Insulators are designed and selected to withstand electrical, mechanical, and environmental stresses. Over the life of the power transmission line, electrical stresses can be generated within the insulators due to continuous operations and the associated temporary overvoltages produced by switching, faults, and lightning. Mechanical stresses can also be generated within the insulators, as a result of the conductor dead weight, ice formation, and wind loading. Environmental stresses can impact both the electrical performance and the mechanical performance of insulators, and can be caused by ambient temperature fluctuations, UV radiation, rain, icing, pollution, and altitude.

When suspended by support structures, a conductor typically exhibits a curved shape, with a minimum clearance to ground occurring at some point between the two closest suspension poles or towers. The minimum clearance to ground, or to other energized parts, is typically determined by the engineering standards adopted for the location (e.g., state or federal), and depends on the voltage of the transmission line. Higher voltage lines typically have a greater specified minimum clearance to ground, and consequently use higher suspension poles or towers.

Known OH conductors have a non-zero electrical resistivity. When a conductor is carrying power, the electrical current generates heat and the conductor temperature rises above the ambient temperature. The electrical resistance of the conductor increases linearly with increasing temperature, and thus the associated resistive losses ($I^2R$) and can be significant at high power levels. Such losses can also limit the power that a conductor can carry, as conductors have maximum operating temperatures determined by the properties of their component materials. Operating at excessively high temperatures can cause the material properties of the conductor to degrade over time.

Due to thermal expansion, elevated conductor temperatures can cause the length of the conductor to increase, thereby reducing the clearance to ground (i.e., increasing 'sag'). Conductors can also elongate, or "creep," over time due to tension, resulting in a permanently increased sag. This increased sag may be taken into account when determining the minimum clearance to ground during installation of the conductor. The maximum current or power that causes the conductor to reach the maximum allowable sag is known as a "thermal limit."

Many OH conductors have a manufacturer-imposed upper operating temperature limit of 75° C. The maximum rated current for a given operating temperature limit, under prescribed conditions of ambient temperature and wind, is known as the ampacity. OH conductors are typically available with rated ampacities to 2,000 amperes (2,000 A) at 75° C. Some 'high temperature' conductors can be safely operated up to a temperature of 225° C. without permanent damage or excessive sag. The energy losses of maintaining a transmission line at 225° C. over hundreds of miles in length are, however, large.

The "physical thermal limit" of an OH transmission line refers to the amount of power the OH transmission line can transport before reaching its maximum operating temperature. The physical thermal limit can depend on ambient conditions such as atmospheric temperature, sun, wind, time of day (angle of the sun), etc. It is difficult for an operator of the OH transmission line to know the conditions at all locations of the OH transmission line in real time, so the thermal limit is often set conservatively, leading in some cases to transmission lines being significantly underutilized as compared to a scenario in which "dynamic" limits could be used.

In view of the foregoing, it is desirable to increase ampacities to increase the power carried at a specified voltage. It is further desirable to reduce the overall energy losses in transmitting electrical power, to avoid the use of more expensive higher operating temperature materials. It is further desirable to remove the effects of environment on the capacity limits of the transmission line, to allow maximum utilization. The acquisition and permitting of rights of way for power transmission lines is one of the major impediments to installing new power lines or increasing the capacity of existing lines. As such, when designing new transmission lines, ensuring compatibility with an existing system voltage specification (e.g., of an existing transmission line) facilitates the re-use of existing rights of way, thereby reducing costs. The width of the right of way depends on the tower height and, hence, operating voltage. Operating at lower voltages for a given power facilitates the use of shorter towers or poles, thereby reducing environmental impacts and potentially increasing public acceptance.

In some applications, it is desirable to electrically insulate a conductor to reduce its potential to initiate fires. Enclosing a conductor in electrical insulation can also thermally insulate the conductor, however, thereby increasing its temperature for a given power dissipation. This reduces the ampacity of a thermally limited conductor and hence the power for a given voltage.

Some electrically insulated conductors include a second conductor layer at ground potential (or negative system voltage) outside the insulator. If this outer 'shield' conductor has the same ampacity as the inner ("core") conductor and the circuit is arranged so that it always carries the same current as the core but with the opposite polarity, then the external magnetic and electrical fields are always zero. A current carrying shield can also act to reduce the self-inductance of the conductor with potential system benefits. A shield with nonzero electrical resistance, however, will generate heat when carrying current, thus reducing the thermal limit of the system.

In view of the foregoing, there is a need for transmission line systems that can carry AC power and/or DC power at currents higher than those of known systems discussed above and/or at voltage levels lower than those of known systems, that can be suspended from poles or towers, whose power capacity is substantially independent of the environmental conditions, whose power/energy losses to heat are lower, that have reduced visual impact, and that utilize narrower rights of way for a given power rating. The conductors of such transmission line systems may be electrically insulated and, optionally, include a shield layer that does not significantly reduce ampacity. Such transmission line systems are the subject of the present disclosure. Examples of transmission line systems with superconductors can be found in U.S. provisional patent application No. 63/115,140, titled "Suspended Superconducting Transmission Lines," filed Nov. 18, 2020 ("the '140 application"), which is hereby incorporated by reference in its entirety. Examples of cooling systems for superconducting power transmission lines, compatible with embodiments of the present disclosure, can be found in U.S. provisional patent application No. 63/115,226, titled, "Systems and Methods for Cooling of Superconducting Power Transmission Lines," filed Nov. 18, 2020 ("the '226 application"), which is hereby incorporated by reference in its entirety.

Some embodiments described herein include conductor assemblies with superconductor materials for transporting AC electrical power or DC electrical power. The conductor assemblies with superconducting materials can exhibit reduced energy losses. A flow of coolant through the conductor assemblies can maintain the superconducting materials in the conductor assemblies at a specified operating temperature. Preparing the coolant for use may utilize a significant amount of energy, and as such, the coolant may be prepared for use in advance of (i.e., at a time earlier than) a time of use. In this manner, the energy losses of the conductor system are effectively 'time shifted'.

In some embodiments, a conductor assembly can include a conducting element having a plurality of wires or tapes. The plurality of wires can include at least one superconductor. In some embodiments, the plurality of wires can be wound around a former and conform to the shape of the former. The conductor assembly can also include a TIJ to minimize an amount of heat that reaches the conducting element from the surroundings of the conducting element. The TIJ can be maintained at a system voltage level, or can be electrically grounded. In some embodiments, the conductor assembly can include a tensile support system disposed within the TIJ. In some embodiments, the tensile support system can support the conductor and suspend the conductor aboveground. In some embodiments, an electrical insulation layer can be disposed around the outside of the plurality of the wires and inside the TIJ. In some embodiments, an electrical insulation layer can be disposed around the outside of the TIJ. In some embodiments, a coolant tube can be disposed in the TIJ. In some embodiments, the coolant tube can transport coolant through the conductor assembly. In some embodiments, the coolant tube can be designed to structurally support the conductor assembly and to absorb/bear tension incident upon suspended transmission lines. In some embodiments, the coolant tube can be designed to be compatible with or withstand a large pressure difference between the inside of the coolant tube and the outside of the coolant tube. In some embodiments, coolant inside the coolant tube can be kept at a high pressure while the outside of the coolant tube is kept at or near atmospheric pressure. In some embodiments, the coolant tube can be designed to withstand high pressure differentials between the inside of the coolant tube and the outside of the coolant tube such that a TIJ disposed around the outside of the coolant tube need not be designed for high pressure flow or provide significant structural support to the conductor assembly. In some embodiments, the coolant tube can include a plurality of pores or openings for transfer of coolant to the surroundings of the conducting element.

In some embodiments, a separate tension cable or tension wire is included in the TIJ of the conductor system and configured to structurally support the conductor assembly and to absorb/bear tension incident upon suspended transmission lines. Alternatively or in addition, the former of the conductor system can be configured to structurally support the conductor assembly and to absorb/bear tension incident upon suspended transmission lines. Alternatively or in addition, one or multiple walls of the TIJ itself can be of a sufficient thickness to structurally support the conductor assembly and to absorb/bear tension incident upon suspended transmission lines.

Although functional elements are listed separately herein, it may be advantageous to combine two or more functions into one element. For example, the mechanical tensile support could be formed from a portion of the TIJ. Implementation of embodiments described herein can aid in high-current power transmission over long distances with relatively low losses.

FIG. 1 is a block diagram showing components of a conductor system 100, according to an embodiment. The conductor system 100 includes a former 110 with superconductor wires or tapes 120 disposed about (e.g., wrapped around, positioned along, etc.) the former 110, and a TIJ 130 disposed around the outside of the superconductor wires or tapes 120, defining a coolant flow space 140. In some embodiments, the conductor system 100 can include an external layer 150 disposed around the outside of the TIJ 130.

In some embodiments, the former 110 can include a solid wire. In some embodiments, the former 110 can include a braided wire rope. In some embodiments, the former 110 can have a hollowed out-interior, such that the former 110 can transport gas, vapor, and/or liquid coolant fluid therethrough, to assist with cooling of the conductor assembly 100. In some embodiments, the former 110 can be porous to allow ingress and egress of liquid, vapor, and/or gas coolant. In some embodiments, the former 110 can carry or bear some or all of the tensile force incident upon the conductor assembly 100 (e.g., as part of a suspended conductor assembly). Alternatively or in addition, the TIJ 130 can carry or bear some or all of the tensile force incident upon the conductor assembly 100 (e.g., as part of a suspended conductor assembly).

In some embodiments, the former 110 can be composed of an electrically conductive material. In some embodiments, the former 110 can be composed of aluminum, copper, steel, aluminum conductor steel-reinforced (ASCR), niobium, lanthanum, niobium-tin, yttrium, bismuth, graphene, strontium, indium, tantalum, gallium, technetium, ruthenium, rhenium, hafnium, osmium, or any combination thereof. In some embodiments, the former 110 can be composed of an electrically insulative material. In some embodiments, the former 110 can be composed of fiberglass, silicon dioxide, polyethylene, polypropylene, a polymer, or any combination thereof. In some embodiments, the former 110 can be composed of a composite conductive-insulative material.

In some embodiments, the former 110 can have a cylindrical shape (i.e., the former 110 can have a circular axial cross section). In some embodiments, the former 110 can have an elliptical axial cross section. In some embodiments, the former 110 can have a square axial cross section or a rectangular axial cross section. In some embodiments, the former 110 can have a cross-sectional diameter of at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, at least about 4 cm, at least about 5 cm, at least about 6 cm, at least about 7 cm, at least about 8 cm, at least about 9 cm, at least about 10 cm, at least about 20 cm, at least about 30 cm, or at least about 40 cm. In some embodiments, the former 110 can have a cross-sectional diameter of no more than about 50 cm, no more than about 40 cm, no more than about 30 cm, no more than about 20 cm, no more than about 10 cm, no more than about 9 cm, no more than about 8 cm, no more than about 7 cm, no more than about 6 cm, no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, or no more than about 1 mm. Combinations of the above-referenced cross-sectional diameters of the former 110 are also possible (e.g., at least about 1 mm and no more than about 50 cm or at least about 5 mm and no more than about 10 cm), inclusive of all values and ranges therebetween. In some embodiments, the former 110 can have a cross-sectional diameter of about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, about 5 cm, about 6 cm, about 7 cm, about 8 cm, about 9 cm, about 10 cm, about 20 cm, about 30 cm, about 40 cm, or about 50 cm.

In some embodiments, the superconductor wires or tapes 120 can be wound around the former 110. In some embodiments, the superconductor wires or tapes 120 can be wound around the former 110 in a spiral pattern. In some embodiments, the superconductor wires or tapes 120 can be wound around the former 110 in a non-spiral pattern. In some embodiments, the superconductor wires or tapes 120 can be wound around the former 110 in a single layer. In some embodiments, the number of layers of the superconductor wires or tapes 120, the width of the superconductor wires or tapes 120, the angle and direction of winding can be selected or adjusted based on a desired application. For example, these parameters can be adjusted to minimize AC losses and/or to minimize self-inductance of the conductor assembly 100. Similarly, a number of layers with desired winding angles may be selected to produce desired mechanical and/or electrical characteristics of the conductor assembly 100. In some embodiments, the superconductor wires or tapes 120 can be wound around the former 110 in about 2 layers, about 3 layers, about 4 layers, about 5 layers, about 6 layers, about 7 layers, about 8 layers, about 9 layers, or about 10 layers, inclusive of all values and ranges therebetween.

In some embodiments, the superconductor wires or tapes 120 can, individually or collectively, have a width (i.e., a dimension orthogonal to a longitudinal axis of the superconductor wires or tapes 120) of at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, at least about 4 cm, at least about 5 cm, at least about 6 cm, at least about 7 cm, at least about 8 cm, or at least about 9 cm. In some embodiments, the superconductor wires or tapes 120 can have a width of no more than about 10 cm, no more than about 9 cm, no more than about 8 cm, no more than about 7 cm, no more than about 6 cm, no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, or no more than about 700 µm, no more than about 600 µm. Combinations of the above-referenced widths of the superconductor wires or tapes 120 are also possible (e.g., at least about 500 µm and no more than about 10 cm or at least about 1 mm and no more than about 1 cm), inclusive of all values and ranges therebetween. In some embodiments, the superconductor wires or tapes 120 can have a width of about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, about 5 cm, about 6 cm, about 7 cm, about 8 cm, about 9 cm, or about 10 cm.

In some embodiments, the superconductor wires or tapes 120 can be disposed (e.g., wrapped) around the former 110 at a winding angle (i.e., the angle formed between the direction the superconductor wires or tapes 120 are wrapped and a longitudinal direction of the former 110) of at least 0 degrees, at least about 5 degrees, at least about 10 degrees, at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees, at least about 65 degrees, at least about 70 degrees, at least about 75 degrees, at least about 80 degrees, or at least about 85 degrees. In some embodiments, the superconductor wires or tapes 120 can be wrapped around the former 110 at a winding angle of no more than about 90 degrees, no more than about 85 degrees, no more than about 80 degrees, no more than about 75 degrees, no more than about 70 degrees, no more than about 65 degrees, no more than about 60 degrees, no more than about 55 degrees, no more than about 50 degrees, no more than about 45 degrees, no more than about 40 degrees, no more than about 35 degrees, no more than about 30 degrees, no more than about 25 degrees, no more than about 20 degrees, no more than about 15 degrees, no more than about 10 degrees, or no more than about 5 degrees. Combinations of the above-referenced winding angles are also possible (e.g., at least 0 degrees and no more than about 90 degrees or at least about 20 degrees and no more than about 40 degrees), inclusive of all values and ranges therebetween. In some embodiments, superconductor wires or tapes 120 can be wrapped around the former 110 at a winding angle of about 5 degrees, about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, or about 90 degrees.

In some embodiments, the superconductor wires or tapes 120 can be wrapped around the former 110 in multiple wires per layer. In other words, multiple superconductor wires or tapes 120 can be placed side-by-side and wrapped around the former 110. In some embodiments, about 1, about 2, about 3, about 4, about 5, about 6, about 7, about 8, about 9, about 10, or more superconductor wires or tapes 120 can be wrapped around the former 110 in each layer of the superconductor wires or tapes 120. In some embodiments, the superconductor wires or tapes 120 and the former 110 can collectively be referred to as a conductor core.

The TIJ 130 encloses the superconductor wires or tapes 120 and defines the coolant flow space 140. In some embodiments, the TIJ 130 can be formed to minimize the amount of heat from the surrounding environment that reaches the superconductor wires or tapes 120. In use, a temperature gradient exists across the thickness of the TIJ 130, such that the inner surface of the TIJ 130 is at the temperature of the coolant while the outer surface of the TIJ 130 is at ambient temperature. In some embodiments, the TIJ 130 can be load bearing, such that the TIJ 130 provides mechanical support for the conductor system 100. In some embodiments, an additional tube (not shown) can be placed inside the TIJ to provide mechanical support. Alternatively or in addition, a cable, a metal rope, a solid rod, or any combination thereof can be placed inside the TIJ to provide mechanical support.

In some embodiments, the TIJ 130 can include multiple layers of material. In some embodiments, the TIJ 130 can include about 1, about 2, about 3, about 4, about 5, about 6, about 7, about 8, about 9, about 10, or more layers of material. In some embodiments, the TIJ 130 can multiple corrugated or non-corrugated pipes spaced apart from one another with a vacuum or inert gas interposed therebetween. In some embodiments, the TIJ 130 can be thermally insulative. In some embodiments, the TIJ 130 can be electrically insulative. In some embodiments, the TIJ 130 can be both thermally insulative and electrically insulative. In some embodiments, the TIJ 130 is not dielectrically insulated using a solid insulation material. Instead, air external to the conductor assembly 100 can be used as insulation, similar to the manner in which air can be used to dielectrically insulate known transmission conductors, if the system is designed such that the thermally insulating member(s) operate at the same voltage as the conductor(s). A minimum clearance may be maintained between the conductor assembly 100 and other structures and ground.

In some embodiments, one or more solid dielectric layers are disposed on an outer surface of a conductor assembly 100 of an overhead, suspended power transmission line. In some embodiments, the TIJ 130 can include a dielectric insulator disposed between two concentric walls. Inclusion of a dielectric insulator can reduce fire risk. In some embodiments, a dielectric insulator can be disposed between the superconductor wires or tapes 120 and the TIJ 130. In some embodiments, the dielectric insulator can include a solid dielectric material (e.g., XLPE or PPLP).

In some embodiments, the TIJ 130 can include one or more metal layers. In some embodiments, the TIJ can include one or more layers composed of foam, fiberglass, polyurethane, wood, foam, cork, cardboard, corrugated materials, paper, porcelain, ceramic, polymers, polystyrene, polyethylene, polypropylene, silicon dioxide, quartz, glass, or any combination thereof.

In some embodiments, the TIJ 130 can have a thickness of at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, at least about 4 cm, at least about 5 cm, at least about 6 cm, at least about 7 cm, at least about 8 cm, or at least about 9 cm. In some embodiments, the TIJ 130 can have a thickness of no more than about 10 cm, no more than about 9 cm, no more than about 8 cm, no more than about 7 cm, no more than about 6 cm, no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, or no more than about 700 µm, no more than about 600 µm. Combinations of the above-referenced thicknesses of the TIJ 130 are also possible (e.g., at least about 500 µm and no more than about 10 cm or at least about 1 mm and no more than about 1 cm), inclusive of all values and ranges therebetween. In some embodiments, the TIJ 130 can have a thickness of about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, about 5 cm, about 6 cm, about 7 cm, about 8 cm, about 9 cm, or about 10 cm.

In some embodiments, the coolant flow space 140 can be filled with a flowing liquid coolant. If the superconductor wires or tapes 120 include one or more cryogenically cooled superconductors, the liquid coolant can be a liquid cryogen (e.g., liquid nitrogen, liquid helium, liquid hydrogen, liquid neon, liquid natural gas, or liquid air). In cryogenic embodiments, the heat energy entering the conductor assembly 100 from the surroundings should be minimized, to minimize the cooling requirements. This can be accomplished by, for example, using a double-walled vacuum insulated pipeline as the TIJ 130.

In some embodiments, the external layer 150 can be disposed around the outside of the TIJ 130. In some embodiments, the external layer 150 can be an electrically conducting layer. In some embodiments, the external layer 150 can be a solid dielectric layer to reduce fire risk. In some embodiments, the external layer 150 can provide additional structural reinforcement for the conductor assembly 100. In some embodiments, the external layer 150 can aid in preventing damage from projectiles incident upon the conductor assembly 100. In some embodiments, the external layer 150 can be composed of a metal. In some embodiments, the external layer 150 can be composed of aluminum. In some embodiments, the external layer 150 can have a thickness of at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, or at least about 9 mm. In some embodiments, the external layer 150 can have a thickness of no more than about 10 mm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, no more than about 700 µm, or no more than about 600 µm. Combinations of the above-referenced thicknesses of the external layer 150 are also possible (e.g., at least about 500 µm, and no more than about 10 mm, or at least about 1 mm and no more than about 5 mm), inclusive of all values and ranges therebetween. In some embodiments, the external layer 150 can have a thickness of about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, or about 10 mm.

In some embodiments, the external layer 150 can include a continuous tube. In some embodiments, the external layer 150 can have the same or substantially similar thermal contraction to the former 110. In some embodiments, the conductor assembly 100 is configured such that a fluid (including a liquid, a vapor, a gas, or any combination thereof) flows outside of the TIJ 130. In some embodiments, fluid can flow or be contained in an annular region between the TIJ 130 and the external layer 150. For example, in some embodiments, the TIJ 130 may be a first TIJ, and the conductor assembly 100 may further include a second TIJ (not shown), with the annular region defined between the first TIJ and the second TIJ. Alternatively or in addition, the conductor assembly 100 may further include a continuous tube, disposed within the TIJ 130 but outside the superconductor wires or tapes 120, such that a coolant flow space is defined entirely within the continuous tube (i.e., between the superconductor wires or tapes 120 and the continuous tube), entirely outside the continuous tube (i.e., between the continuous tube and the TIJ 130), or defined both within and outside the continuous tube. In some embodiments, the external layer 150 can be disposed within the TIJ 130 and act as a mechanical tensile support element. In other words, a single component disposed around the outside of the superconductor wires or tapes 120 can include both the TIJ 130 and the external layer 150.

Although shown in FIG. 1 as being disposed outside the TIJ 130, in other embodiments, the external layer 150 can be disposed outside the superconductor wires or tapes 120 and inside the TIJ 130, for example when the external layer 150 includes superconducting material). In some embodiments, fluid can flow in an annular space outside the external layer 150 and inside the TIJ 130. In some embodiments, fluid can flow in an annular space inside the external layer 150 and outside the superconductor wires or tapes 120. In some embodiments, fluid can flow in the annular space outside the external layer 150 and inside the TIJ 130 as well as the annular space inside the external layer 150 and outside the superconductor wires or tapes 120. In some embodiments, multiple thermally insulating jackets can be disposed around the superconductor wires or tapes 120. In some embodiments, fluid can flow outside a first TIJ and inside a second TIJ.

Figure 2:
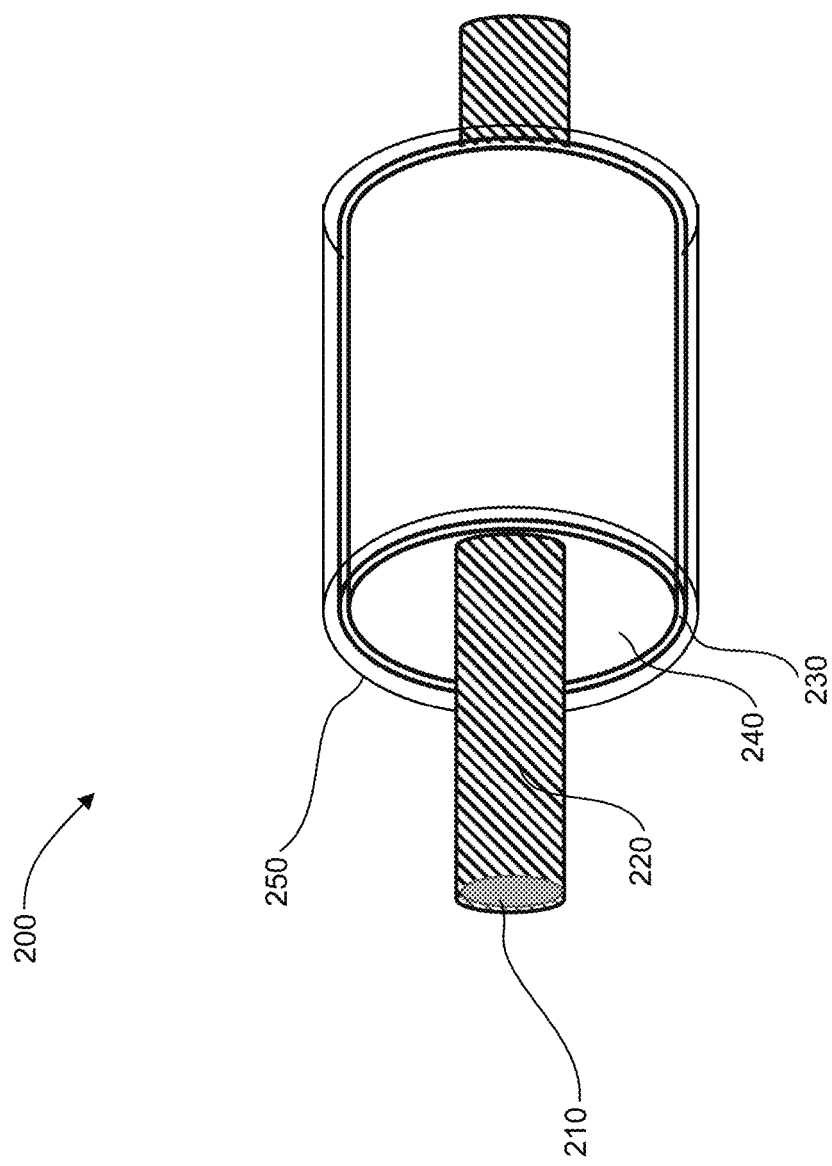
FIG. 2 illustrates a section of a conductor assembly for a superconducting power transmission line/system, according to an embodiment.

FIG. 2 shows a perspective view of a section of a conductor assembly 200, according to an embodiment. In some embodiments, the conductor assembly 200 can be included in a superconducting OH power transmission line/system. In some embodiments, the conductor assembly 200 can be included in a superconducting underground power transmission line/system. As shown in FIG. 2, the conductor assembly 200 includes a former 210, a plurality of superconductor wires or tapes 220 wrapped around the former 210, a TIJ 230, and a coolant flow space 240. In some embodiments, the conductor assembly 200 can include an external layer 250. In some embodiments, the former 210, the plurality of superconductor wires or tapes 220, the TIJ 230, the coolant flow space 240, and the external layer 250 can be the same or substantially similar to the former 110, the plurality of superconductor wires or tapes 120, the TIJ 130, the coolant flow space 140, and the external layer 150, as described above with reference to FIG. 1. Thus, certain aspects of the former 210, the plurality of superconductor wires or tapes 220, the TIJ 230, the coolant flow space 240, and the external layer 250 are not described in greater detail herein.

In some embodiments, the superconductor wires or tapes 220 can, for example, include non-spiral wound wires or tapes (i.e., wires or tapes laid along a surface such as a surface of a former, discussed further below), multiple tapes interleaved with spacers, a combination thereof, etc. When the superconductor wires or tapes 220 are cooled below a 'critical temperature' (e.g., at or below −100° C.), the superconductor wires or tapes 220 can carry direct, or constant, electrical currents (i.e., DC current) with no resistance or with substantially no resistance, and as such, no heat is generated in the superconductor wires or tapes 220 from the DC current. Alternating, or time varying, currents (i.e., AC currents) can generate a small (relative to non-superconducting materials) amount of heat in the superconductor wires or tapes 220. For example, the conductor assembly 200 may generate 0.5 W/m of heat when carrying 1,000 Arms, as contrasted with a known Aluminum conductor steel-reinforced ("ACSR") cable, which typically generates about 68 W/m of heat during operation.

The superconductor wires or tapes 220 may be wound on the former 210, for example in a spiral fashion (as shown in FIG. 2), in multiple layers with multiple superconductor wires per layer. Alternatively, the superconducting wires/tapes 220 may be placed in a non-spiral manner on the former 210. Parameters such as the number of wires/tapes per layer, the width or diameter of the superconductor wire/tape, the angle and direction of winding, and the number of layers can be selected or adjusted based on a desired application, for example to minimize AC losses and/or to minimize self-inductance of the conductor assembly 200. Similarly, a number of layers with desired winding angles may be selected to produce desired mechanical and/or electrical characteristics of the conductor assembly 200. The superconductor wires or tapes 220 and the former 210 can collectively be referred to as a conductor core.

In some embodiments, the former 210 is hollow such that it can carry gas, vapor and/or liquid coolant fluid to assist with cooling of the conductor assembly 200. Alternatively or in addition, the former 210 may be porous to allow the ingress or egress of liquid, vapor or gas coolant.

In some embodiments, the former 210 may carry or bear some or all of the tensile force during suspension of the conductor assembly 200 (e.g., as part of a suspended conductor assembly).

The TIJ 230 encloses the superconductor wires or tapes 220 and defines the coolant flow space 240 configured to minimize an amount of heat from the surroundings that reaches the superconductor wires or tapes 220. During operation, an inner surface of the TIJ 230 can be cooled to a temperature of the coolant, while an outer surface of the TIJ 230 can be at ambient temperature, and the inner surface of the TIJ 230 can be load bearing (i.e., providing mechanical support). Alternatively or in addition, a separate cable or tube positioned within the TIJ 230 can be load bearing and provide mechanical support.

The TIJ 230, itself, can include, for example, two concentric flexible corrugated or non-corrugated metal pipes spaced from one another, with vacuum or another material (e.g., carbon dioxide ($CO_2$), an inert gas, etc.) disposed between the two flexible corrugated metal pipes. As another example, the TIJ 230 may include two concentric rigid corrugated or non-corrugated metal pipes spaced from one another, with vacuum or another material (e.g., an inert gas) disposed between the two rigid corrugated metal pipes. As yet another example, the TIJ 230 may include two concentric semi-rigid corrugated or non-corrugated metal pipes spaced from one another, with vacuum or another material (e.g., an inert gas) disposed between the two metal pipes. The phrase "semi-rigid," as used herein, can refer to the property of being able to bend slightly (e.g., to a radius of curvature of no less than 10 meters) under a mechanical load. Alternatively, the TIJ can include another type of thermal insulation, such as expanded foam. The TIJ 230 can be manufactured in segments having lengths that are appropriate for shipping, transport and installation.

In some embodiments, an interior surface of the TIJ 230 is configured to (or has mechanical/materials properties such that it will) thermally contract upon being cooled to an operating temperature. This contraction can be significant, for example if the operating temperature is below −100° C. An exterior wall of the TIJ 230 can be configured to (or have mechanical/materials properties such that it will) accommodate the reduction in length of the interior surface of the TIJ 230, along with the other elements of the conductor assembly 200. In some implementations, one or more elements providing the tensile strength of the conductor assembly 200 are selected such that they exhibit a contraction that is similar to, or that matches, the thermal contraction of the inner wall of the 230. In such implementations, the conductor assembly 200 can be installed between poles or towers supporting the OH power transmission line at ambient temperatures with a specified pre-calculated tension. This tension results in an acceptable sag of the conductor assembly 200 between the poles/towers, and an acceptable closest approach to ground level. During operation, and upon being cooled to the operating temperature, the conductor assembly 200 (under tension) contracts, the mechanical tension of the conductor assembly 200 increases, and the sag decreases. The tension at operating temperature is thereafter maintained within acceptable limits for use in power transmission lines.

In some embodiments, the coolant flow space 240 is filled with a flowing liquid coolant. If the superconductor wires or tapes 220 include one or more cryogenically cooled superconductors, the liquid coolant can be a liquid cryogen (e.g., liquid nitrogen, liquid helium, liquid neon, liquid natural gas, or liquid air). In cryogenic embodiments, the heat energy entering the conductor assembly 200 from the surroundings should be minimized, to minimize the cooling requirements. This can be accomplished by, for example, using a double-walled, vacuum-insulated pipeline as the TIJ 230.

In some embodiments, when used in the context of a superconducting OH power transmission (or and/or distribution) system, the conductor core (i.e., the superconductor wires or tapes 220 and the former 210), the coolant and the TIJ 230 are maintained at the system operating voltage.

In some embodiments, the TIJ 230 is not dielectrically insulated using a solid insulation material. Instead, air external to the conductor assembly 200 can be used as dielectric insulation, similar to the manner in which air can be used to dielectrically insulate known transmission conductors, if the system is designed such that the thermally insulating member(s) operate at the same voltage as the conductor(s). Previous attempts to develop superconducting cables with a "warm dielectric," in which the thermal insulating members are operated at line voltage, pertained to underground applications and required external solid insulation.

As discussed above, in some embodiments, suspended conductor assemblies are attached to the towers using one or more dielectric insulators. In some such embodiments, the dielectric insulators are configured to transport liquid nitrogen and/or vapor nitrogen from one or more high voltage regions of the superconducting OH power transmission system to ground potential. Heat that enters the TIJ 230 or that is generated by electrical energy losses and/or magnetic energy losses inside the TIJ 230 should be removed from the superconducting OH power transmission system to ensure that an appropriate operating temperature is maintained. Intermediate cooling stations disposed on one or more towers of the superconducting OH power transmission system can be used to accomplish this. If the intermediate cooling station(s) produce excess vapor by utilizing boiling coolant, this excess can be vented to atmosphere.

In some embodiments, multiple conductor assemblies as shown in FIG. 2 are supported by poles or towers to maintain an adequate clearance between the conductor assemblies and the ground. The spacing between the poles or towers and the tensile strength of the conductor assemblies can be selected such that a desired suspension can be maintained throughout operation. Tensile forces on the conductor assemblies can be carried/borne by one or more components of the superconducting OH power transmission system, such as the former 210, the inner wall of the TIJ 230, and/or an additional force carrying member (such as steel rope or wire), that are disposed within a cooled region of the superconducting OH power transmission system or underground power transmission system. Similarly, multiple conductor assemblies as shown in FIG. 2 can run underground beside one another. In some embodiments, multiple conductor assemblies as shown in FIG. 2 can run beside one another as part of a superconducting OH power transmission line.

In some embodiments, the external layer 250 can be disposed around the outside of the TIJ 230. In some embodiments, the external layer 250 can include an electrically insulating material. In some embodiments, the external layer 250 can include a shield layer or multiple shield layers of superconducting wires or tapes. In some embodiments, the external layer 250 can be an electrically conducting layer. In some embodiments, the external layer 250 can provide additional structural reinforcement for the conductor assembly 200. In some embodiments, the external layer 250 can aid in preventing damage from projectiles incident upon the conductor assembly 200. In some embodiments, the external layer 250 can be composed of a metal. In some embodiments, the external layer 250 can be composed of aluminum.

In some embodiments, the external layer 250 can have a thickness of at least about 500 $\mu$m, at least about 600 $\mu$m, at least about 700 $\mu$m, at least about 800 $\mu$m, at least about 900 $\mu$m, at least about 1 mm, at least about 2 mm, at least about 3 mm, at least about 4 mm, at least about 5 mm, at least about 6 mm, at least about 7 mm, at least about 8 mm, or at least about 9 mm. In some embodiments, the external layer 250 can have a thickness of no more than about 10 mm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 $\mu$m, no more than about 800 $\mu$m, no more than about 700 $\mu$m, or no more than about 600 $\mu$m. Combinations of the above-referenced thicknesses of the external layer 250 are also possible (e.g., at least about 900 $\mu$m, and no more than about 10 mm, or at least about 1 mm and no more than about 5 mm), inclusive of all values and ranges therebetween. In some embodiments, the external layer 250 can have a thickness of about 500 $\mu$m, about 600 $\mu$m, about 700 $\mu$m, about 800 $\mu$m, about 900 $\mu$m, about 1 mm, about 2 mm, about 3 mm, about 4 mm, about 5 mm, about 6 mm, about 7 mm, about 8 mm, about 9 mm, or about 10 mm.

Each conductor assembly 200 can be installed in an un-cooled (i.e., ambient temperature) state between a pair of poles, and will exhibit a first curvature (e.g., a catenary) when suspended. The first curvature can be described as a first sag, which depends on the tension forces exerted at the poles. When coolant begins to flow within the conductor assemblies 200, the internal temperature of the conductor assemblies 200 decreases and, due to thermal contraction, the element(s) of the conductor assemblies 200 that bear the tensile forces contract or become shorter. This contraction causes a reduction in the sag, resulting in a second curvature different from (and shallower than) the first curvature, and the tension forces increase. The decrease in length of the element(s) can be, for example, about 0.5%, for example for conductor assemblies that are cooled using liquid nitrogen. As discussed above, in some embodiments, all components disposed within the cooled region of the superconducting OH power transmission system or underground power transmission system are configured to (or have mechanical or material properties such that they) contract in length similarly. In other words, the difference in thermal contraction between installation ambient temperature and operating temperature is less than that which would result in a permanent deformation of one or more of the components. For example, if one of the components is placed under tensile stress by a differential contraction, the stress may be less than a quarter of the yield stress (assuming an engineering safety factor of 4 is appropriate for the application). In direct contrast with known systems, superconducting OH power transmission lines of the present disclosure exhibit the same sag (or substantially the same sag), and hence the same clearance to ground (or substantially the same clearance to ground), under all electrical loads and environmental temperatures (excluding the impact of the presence of ice on the superconducting OH power transmission lines).

In some embodiments, all components (except the superconductor wires or tapes 220) disposed within the cooled region of the superconducting OH power transmission system are fabricated from the same type of material.

The capacitance of a power transmission line is one of the parameters that determines the operating characteristics of the power transmission line in an AC grid, and that influences the surge impedance loading (i.e., the ratio of the amplitudes of voltage and current of a single wave propagating along the power transmission line). The capacitance of a power transmission line can be determined by integrating the electric field from the outer envelope of the power transmission line to an upper limit distance determined by the placement of other phases of the circuit and/or the ground. The electric field near a conductor varies as $1/r$ ($r$ being the distance from the center of a conductor), and consequently, the radius of the 'at voltage' envelope significantly determines the capacitance. The assembly of FIG. 2, with the outer wall of the TIJ 230 maintained at the system operating voltage, has a capacitance that is lower than that of known power transmission lines, which offers operational advantages.

Figure 3:
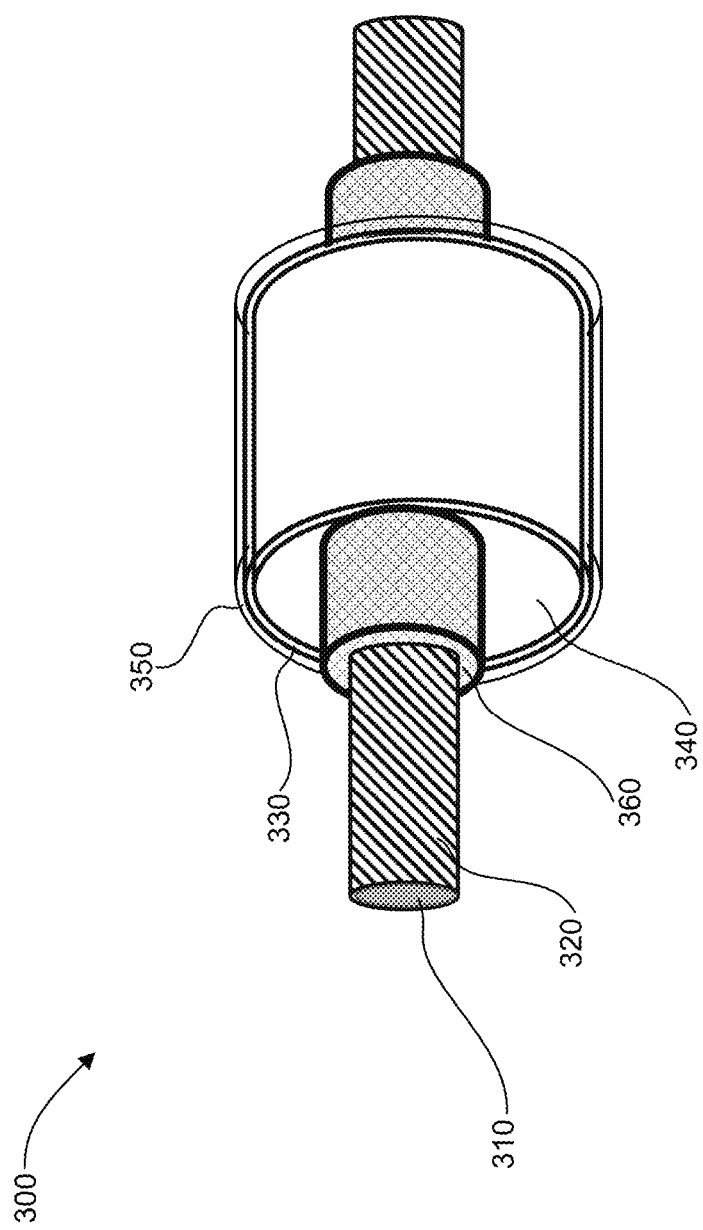
FIG. 3 illustrates a conductor assembly for a superconducting power transmission line/system, including electrical insulation adjacent to one or more superconductors (e.g., superconductor wires or tapes) and disposed within a TIJ, according to an embodiment.

FIG. 3 shows a perspective view of a section of a conductor assembly 300 for a superconducting OH power transmission line/system or an underground power transmission line/system, according to an embodiment. As shown, the conductor assembly 300 includes a former 310, a plurality of superconductor wires or tapes 320 wrapped around the former 310, a TIJ 330, a coolant flow space 340, an external layer 350, and electrical insulation 360 adjacent to one or more superconductors (superconductor wires or tapes 320). In some embodiments, the former 310, the superconductor wires or tapes 320, the TIJ 330, the coolant flow space 340, and the external layer 350 can be the same or substantially similar to the former 210, the superconductor wires or tapes 220, the TIJ 230, the coolant flow space 240, and the external layer 250, as described above with reference to FIG. 2. Thus, certain aspects of the former 310, the superconductor wires or tapes 320, the TIJ 330, the coolant flow space 340, and the external layer 350 are not described in greater detail herein.

As shown in FIG. 3, the electrical insulation 360 is disposed fully within the TIJ 330 such that the electrical insulation 360 is cooled to the superconductor operating temperature during operation of the superconducting OH power transmission line/system or the underground power transmission line/system. The embodiment of FIG. 3 can be referred to as a "cold dielectric design." The thickness of the electrical insulation 360 can be selected to ensure that all other components within the TIJ 330 are maintained at ground potential without the risk of short-circuiting. In the embodiment of FIG. 3, there is no electric field away from the conductor assembly 300 (i.e., the magnitude of the electric field vector, irrespective of the direction of the field vector, is zero). In some embodiments, the electrical insulation 360 can include a dielectric material (e.g., cross-linked polyethylene ("XLPE") or polypropylene laminated paper ("PPLP"). Superconducting OH power transmission lines using one or more conductor assemblies of FIG. 3 can be referred to as "minimal fire hazard" power lines, in that any objects coming into contact with the power line (e.g., tree branches, vegetation) will not form a short circuit to ground, and will not ignite fuel. In other embodiments, the thickness of the electrical insulation 360 may be selected at a level that achieves less than full electrical insulation (i.e., partial electrical insulation), in which case the electrical insulation 360 presents a high resistivity barrier to an electrical short circuit reducing the fault current flowing. Superconducting OH power transmission lines using one or more such conductor assemblies can be referred to as "reduced fire hazard" power lines.

In some embodiments, an electrically conducting external layer 350 is applied to at least a portion of (e.g., an entire exterior surface of) the electrical insulation 360 in the embodiment of FIG. 3. The electrically conducting external layer 350 can include, for example, a non-superconducting winding. The electrically conducting external layer 350 can be connected to ground potential, or to external apparatus(es), in such a way as to carry a current that is equal to (or substantially equal to), but of opposite polarity (e.g., instantaneous AC, or DC) as compared with, the current in the conductor core (which includes the superconductor wires or tapes 320 and the former 310). The net current in the conductor assembly 300 is then zero, and in this case the magnetic field away from the conductor assembly 300 is also zero. If the electrically conducting external layer 350 is electrically grounded as discussed above, the operation of the conductor assembly 300 does not result in any electric field or magnetic field outside the TIJ 330. Superconducting OH power transmission lines using one or more such conductor assemblies of FIG. 3 can be referred to as "zero external electromagnetic field ("EMF")" power lines.

In some embodiments, an electrically conducting layer (also referred to herein as a "shield layer") can be applied to at least a portion of (e.g., spanning an entire exterior surface of) the electrical insulation 360 in the embodiment of FIG. 3. The shield layer can include, for example, a superconducting winding or a non-superconducting winding. Alternatively or in addition, a shield layer can be applied to the external layer 350, and can include, for example, and non-superconducting material. In some embodiments, the shield layer is superconducting if disposed inside the TIJ 330 (e.g., on a surface of or adjacent to the electrical insulation 360), and the shield layer is non-superconducting if disposed outside the TIJ 330 (e.g., as or on the external layer 350).

During operation of a power line including the conductor assembly 300, the current flowing in the shield layer can be controlled, to control the self-inductance of the AC power line. For example, if the shield layer carries a current that is equal in magnitude and opposite in polarity to the current of the conductor core, there is no magnetic field outside the power line and the self-inductance of the power line is minimized. Conversely, reducing the shield current using an external means can cause the self-inductance of the power line to increase. As such, the power flow in the grid and/or power line can advantageously be controlled. The shield layer may be placed along the entire length of, or a portion of the length of, the power line.

In some embodiments, a shield layer (e.g., including a superconducting material) is applied to at least a portion of the electrical insulation 360 (i.e., disposed inside the TIJ 330) and a magnetic layer is applied to at least a portion of the outer surface of the shield layer. Alternatively or in addition, a shield layer (e.g., including a non-superconducting material) is applied to at least a portion of the external layer 350 (i.e., disposed outside the TIJ 330) and a magnetic layer is applied to at least a portion of the outer surface of the shield layer. The magnetic layer can include a material with a magnetic relative permeability greater than unity. If the shield layer carries a current that is equal in magnitude and opposite in polarity to the current of the conductor core, no magnetic field will impinge on the magnetic layer, and the self-inductance of the power line is minimized. Conversely, reducing the shield current using an external means allows the magnetic field to interact with the magnetic material, thereby significantly increasing the self-inductance of the power line. As such, the power flow in the grid and/or power line can advantageously be controlled. The shield layer and/or the magnetic material may be placed along the entire length of, or a portion of the length of, the power line.

Although shown and described in FIG. 3 as including a single conductor core within the TIJ 330, the conductor assembly 300 can alternatively include multiple (e.g., two, three, four, five, or between five and ten) conductor cores within the same TIJ 330. For example, two conductor cores may be included within a TIJ 330 of the conductor assembly 300, for example as the two poles of a DC bipole system. As another example, three conductor cores may be included within a TIJ 330 of the conductor assembly 300, for example as the three phases of a 3-phase AC power transmission system.

Figure 4:
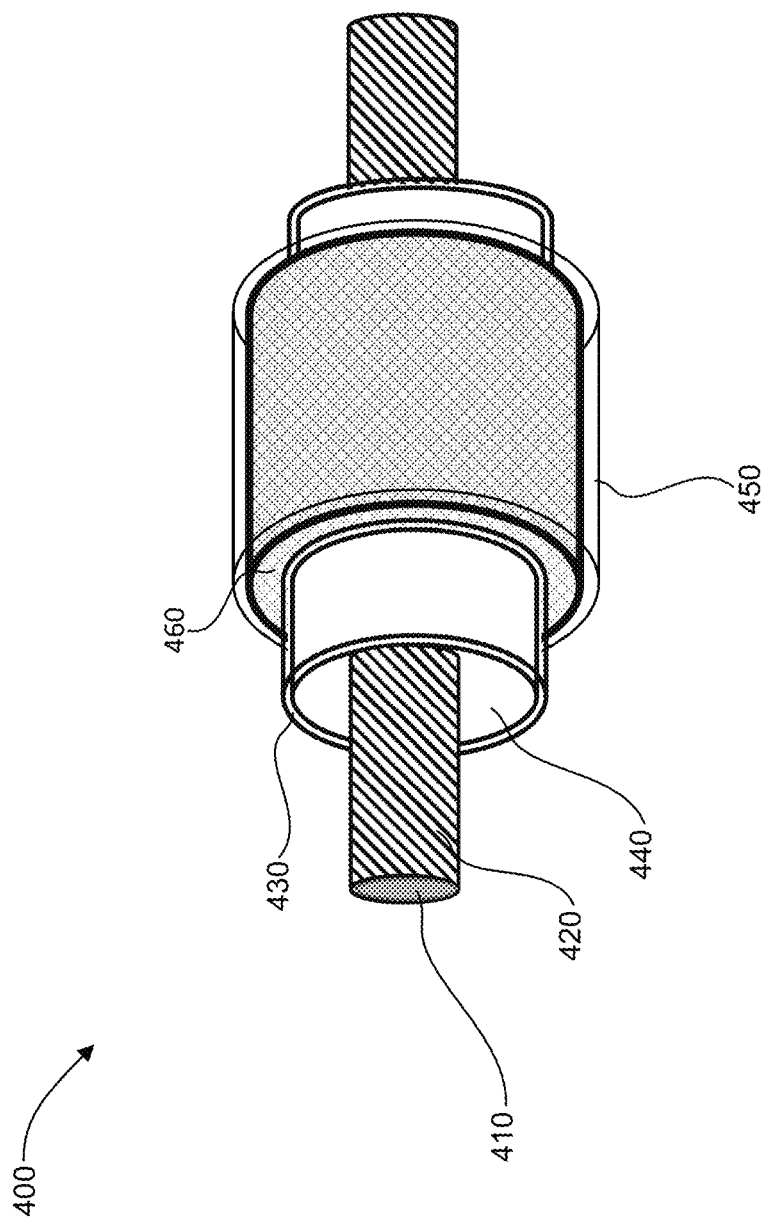
FIG. 4 illustrates a conductor assembly for a superconducting power transmission line/system, including electrical insulation disposed exterior to a TIJ, according to an embodiment.

FIG. 4 shows a perspective view of a section of a conductor assembly 400 for a superconducting OH power transmission line/system or an underground power transmission line/system, according to an embodiment. As shown, the conductor assembly 400 includes a former 410, a plurality of superconductor wires or tapes 420 wrapped around the former 410, a TIJ 430, a coolant flow space 440, and an electrical insulation 460 disposed exterior to the TIJ 430. In some embodiments, the conductor assembly 400 can include an external layer 450. In some embodiments, the former 410, the plurality of superconductor wires or tapes 420, the TIJ 430, the coolant flow space 440, and the electrical insulation 460 can be the same or substantially similar to the former 310, the plurality of superconductor wires or tapes 320, the TIJ 330, the coolant flow space 340, and the electrical insulation 360, as described above with reference to FIG. 3. Thus, certain aspects of the former 410, the plurality of superconductor wires or tapes 420, the TIJ 430, the coolant flow space 440, and the electrical insulation 460 are not described in greater detail herein.

Because the electrical insulation 460 is outside the TIJ 430, the electrical insulation 460 is not cooled to the superconductor operating temperature during operation of the superconducting OH power transmission line/system or the underground power transmission line/system. As such, the embodiment of FIG. 4 can be referred to as a "warm dielectric" design. The thickness of the electrical insulation 460 can be selected such that the conductor assembly 400 can come into contact with a ground potential without risk of a short circuit. Superconducting OH power transmission lines using one or more conductor assemblies of FIG. 4 can be referred to as "minimal fire hazard" power lines, in that any objects coming into contact with the power line (e.g., tree branches, vegetation) will not form a short circuit to ground, and will not ignite fuel. In some implementations, a grounded conductive outer layer is included in the one or more conductor assemblies of FIG. 4, to reduce or eliminate the presence of an electric field outside the electrical insulation 460/conductor assembly 400.

In some embodiments, the coolant flow space 440 can be maintained near local atmospheric pressure by allowing vapor coolant to vent to the atmosphere. In some embodiments, the coolant flow space 440 can be maintained below local atmospheric pressure by pumping vapor coolant out of the coolant flow space 440.

In some embodiments, an electrically conducting external layer 450 is applied to at least a portion of (e.g., an entire exterior surface of) the electrical insulation 460 in the embodiment of FIG. 4. The electrically conducting external layer 450 can include, for example, a non-superconducting winding. The electrically conducting external layer 450 can be connected to ground potential, or to external apparatus(es), in such a way as to carry a current that is equal to (or substantially equal to), but of opposite polarity (e.g., instantaneous AC, or DC) as compared with, the current in the conductor core (which includes the superconductor wires or tapes 420 and the former 410). The net current in the conductor assembly 300 is then zero, and in this case the magnetic field away from the conductor assembly 300 is also zero. If the electrically conducting external layer 350 is electrically grounded as discussed above, the operation of the conductor assembly 300 does not result in any electric field or magnetic field outside the TIJ 330. Superconducting OH power transmission lines using one or more such conductor assemblies of FIG. 3 can be referred to as "zero external electromagnetic field ("EMF")" power lines.

In some embodiments, an electrically conducting layer (also referred to herein as a "shield layer") can be applied to at least a portion of (e.g., spanning an entire exterior surface of) the electrical insulation 460 in the embodiment of FIG. 4. The shield layer can include, for example, a non-superconducting winding. Alternatively or in addition, a shield layer can be applied to at least a portion of the external layer 450, and can include, for example, a non-superconducting winding.

During operation of a power line including the conductor assembly 400, the current flowing in the shield layer can be controlled, to control the self-inductance of the AC power line. For example, if the shield layer carries a current that is equal in magnitude and opposite in polarity to the current of the conductor core, there is no magnetic field outside the power line and the self-inductance of the power line is minimized. Conversely, reducing the shield current using an external means can cause the self-inductance of the power line to increase. As such, the power flow in the grid and/or power line can advantageously be controlled. The shield layer may be placed along the entire length of, or a portion of the length of, the power line.

In some embodiments, a shield layer (e.g., as discussed above) is applied to at least a portion of the electrical insulation 460 or at least a portion of the external layer 450, and a magnetic layer is applied to at least a portion of an outer surface of the shield layer. The magnetic layer can include a material with a magnetic relative permeability greater than unity. If the shield layer carries a current that is equal in magnitude and opposite in polarity to the current of the conductor core, no magnetic field will impinge on the magnetic layer, and the self-inductance of the power line is minimized. Conversely, reducing the shield current using an external means allows the magnetic field to interact with the magnetic material, thereby significantly increasing the self-inductance of the power line. As such, the power flow in the grid and/or power line can advantageously be controlled. The shield layer and/or the magnetic material may be placed along the entire length of, or a portion of the length of, the power line.

In some embodiments, the external layer 450 can include a material with a magnetic relative permeability greater than unity.

Figure 5:
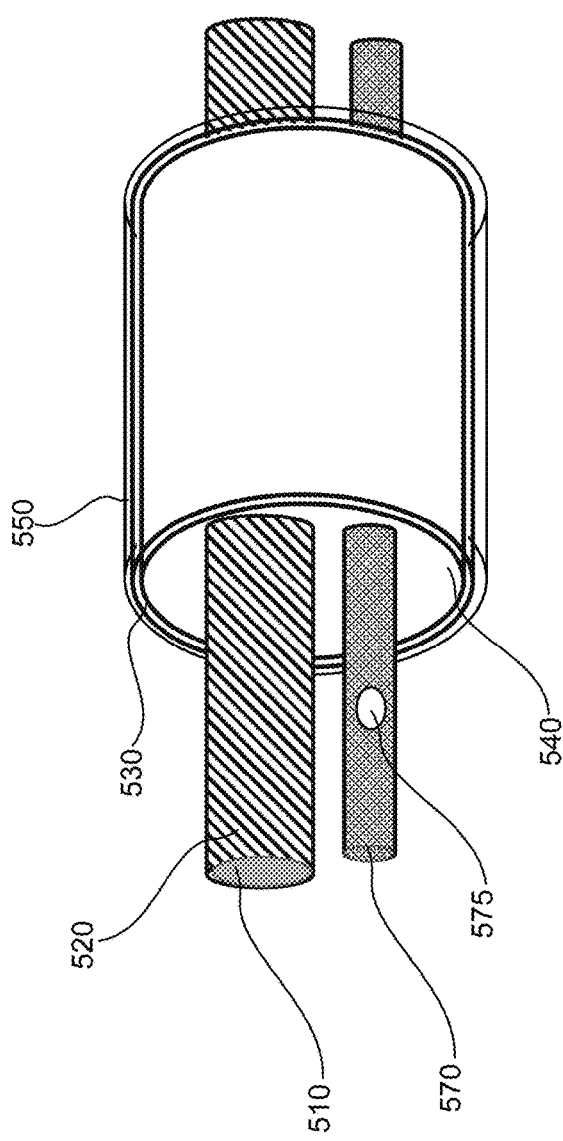
FIG. 5 illustrates a conductor assembly for use in a superconducting power transmission line/system, including a coolant tube, according to an embodiment.

FIG. 5 shows a perspective view of a short section of a conductor assembly 500 for use in a superconducting OH power transmission line/system or an underground power transmission line/system using a "distributed cooling" approach. As shown, the conductor assembly 500 includes a former 510, a plurality of superconductor wires or tapes 520 wrapped around the former 510, a TIJ 530, a coolant flow space 540, and a spray tube 570 with a coolant flow orifice 575. In some embodiments, the conductor assembly 500 can include an external layer 550 disposed around the outside of the TIJ 530. In some embodiments, the former 510, the superconductor wires or tapes 520, the TIJ 530, the coolant flow space 540, and the external layer 550 can be the same or substantially similar to the former 210, the superconductor wires or tapes 220, the TIJ 230, the coolant flow space 240, and the external layer 250, as described above with reference to FIG. 2. Thus, certain aspects of the former 510, the superconductor wires or tapes 520, the TIJ 530, the coolant flow space 540, and the external layer 550 are not described in greater detail herein.

The spray tube 570 carries liquid coolant (e.g., liquid nitrogen) at a pressure greater than a pressure of the coolant flow space 540. In some embodiments, the flow orifice 575 can include a plurality of pores or openings, for example occurring at specified intervals along the length of (and extending through the thickness of a wall of) the spray tube 570. In some embodiments, the flow orifice 575 can include an impeder (e.g., a valve) configured to regulate flow of fluid through the flow orifice 575. The flow orifice 575 is configured to maintain a pressure difference between the spray tube 570 and the coolant flow space 540 (e.g., such that the pressure in the spray tube 570 is maintained substantially above the pressure in coolant flow space 540), and the stability of this pressure difference can help to ensure consistent and stable coolant transfer between the spray tube 570 and the coolant flow space 540. A flow rate of the coolant in the spray tube 570 can be relatively low, and optionally lower than a flow rate of coolant in the coolant flow space 540. For example, the flow rate of the coolant in the spray tube 570 can be at least about 0.1 L/min, at least about 0.2 L/min, at least about 0.3 L/min, at least about 0.4 L/min, at least about 0.5 L/min, at least about 0.6 L/min, at least about 0.7 L/min, at least about 0.8 L/min, at least about 0.9 L/min, at least about 1 L/min, at least about 2 L/min, at least about 3 L/min, at least about 4 L/min, at least about 5 L/min, at least about 6 L/min, at least about 7 L/min, at least about 8 L/min, or at least about 9 L/min, or about 10 L/min. In some embodiments, maintaining a pressure difference between the spray tube 570 and the coolant flow space 540 can maintain the coolant 10 as a subcooled single phase liquid in the spray tube 570. As a subcooled single phase liquid, the coolant 10 in the spray tube 570 has a temperature below the boiling temperature of the coolant 10 at the relatively high pressure of the spray tube 570. Upon entering the relatively lower pressure coolant flow space 540 via the flow orifice 575, the coolant 10 can boil (i.e., the temperature of the coolant entering the coolant flow space 540 is at or above the boiling point temperature of the coolant at the lower pressure in the coolant flow space 540). Heat can also transfer from the coolant 10 in the spray tube 570 to the coolant 10 in the coolant flow space 540 via the walls of the spray tube 570, in which case the spray tube 570 can be considered to self-sub-cool. Upon boiling, the coolant can become a two-phase fluid including liquid and vapor. The conductor assembly 500 operation can be controlled to strike a balance (e.g., between pressures, temperatures, flow rates, etc.) such that the outflow of coolant through the flow orifice 575 is sufficient for the fluid in the coolant flow space 540 to have minimal liquid content (avoiding wasted liquid) and to include only, or to substantially include only, single phase vapor.

In some embodiments, the flow orifice 575 and the impeder can be tuned such that the coolant 10 exists entirely or substantially as a gas in the flow space 540 and the coolant 10 exists entirely or substantially as a subcooled single phase liquid in the spray tube 570. In other words, the coolant 10 can exist as a single phase both in the spray tube 570 and in the flow space 540. This can aid in ease of pumping and flowing the coolant 10 through the spray tube 570, as a single phase substance can be more feasible to pump than a multiphase substance. In some embodiments, the conductor assembly 500 can include pores or vents at periodic intervals on the external layer 550 and/or the TIJ 530 to drain coolant 10 from the conductor assembly 500, such that the coolant 10 remains entirely or substantially as a gas in the flow space 540.

In some embodiments, the flow orifice 575 can include a series of pores (or openings) placed at regular or irregular intervals along the length of (and extending through the thickness of a wall of) the spray tube 570. In one embodiment, the spray tube 570 is a steel tube (having, for example, a 6 mm internal diameter, an 8 mm external diameter, and a 1 mm wall thickness), and the flow orifice 575 includes multiple circular holes, positioned periodically (e.g., 30 cm apart) along the length of the conductor assembly 500 to be cooled. Each of the circular holes can be, for example, 50 μm in diameter, and extend through the wall thickness of the spray tube 570. In some embodiments, the aspect ratio of the pores (i.e., the ratio of the depth through the thickness of the wall of the spray tube 570 to the diameters of the pore) can aid in maintaining the pressure differential between the spray tube 570 and the flow space 540. In some embodiments, the aspect ratio of the pores can be at least about 2:1, at least about 5:1, at least about 10:1, at least about 15:1, at least about 20:1, at least about 25:1, at least about 30:1, at least about 35:1, at least about 40:1, at least about 45:1, or at least about 50:1, inclusive of all values and ranges therebetween. In some embodiments, the aspect ratio of the pores can change along the length of the spray tube 570 and/or the linear spacing of the pores along the length of the spray tube 570 can change, for example to accommodate a reduction in coolant pressure while maintaining a constant degree of cooling. In some embodiments, the aspect ratio of the pores can increase or decrease along the length of the spray tube 570 and/or the linear spacing of the pores along the length of the spray tube 570 can increase or decrease.

In some embodiments, the pores can have constant diameters. In some embodiments, the pores can have variable diameters. In some embodiments, the pores can have diameters of at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 2 mm, at least about 3 mm, at least about 4 mm, at least about 5 mm, at least about 6 mm, at least about 7 mm, at least about 8 mm, or at least about 9 mm. In some embodiments, the pores can have diameters of no more than about 10 mm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 μm, no more than about 800 μm, no more than about 700 μm, no more than about 600 μm, no more than about 500 μm, no more than about 400 μm, no more than about 300 μm, no more than about 200 μm, no more than about 100 μm, no more than about 90 μm, no more than about 80 μm, no more than about 70 μm, no more than about 60 μm, no more than about 50 μm, no more than about 40 μm, no more than about 30 μm, or no more than about 20 μm. Combinations of the above-referenced pore diameters are also possible (e.g., at least about 10 μm and no more than about 10 mm or at least about 50 μm and no more than about 1 mm), inclusive of all values and ranges therebetween. In some embodiments, the pores can have diameters of about 10 μm, about 20 μm, about 30 μm, about 40 μm, about 50 μm, about 60 μm, about 70 μm, about 80 μm, about 90 μm, about 100 μm, about 200 μm, about 300 μm, about 400 μm, about 500 μm, about 600 μm, about 700 μm, about 800 μm, about 900 μm, about 1 mm, about 2 mm, about 3 mm, about 4 mm, about 5 mm, about 6 mm, about 7 mm, about 8 mm, about 9 mm, or about 10 mm.

In some embodiments, the pores can have a diameter of at least about 1 mm or at least about 2 mm, and can be positioned at intervals (e.g., every 50 cm) along the length of the spray tube 570. Each of the pores can be mechanically connected to (e.g., via welding or screw-thread engagement) a nozzle attachment having a nozzle with a desired impedance.

During operation of the conductor assembly 500, liquid coolant can exit the spray tube 570 through the pores or orifice, and enter into the coolant flow space 540, such that the coolant flow space 540 contains coolant vapor and liquid—a two-phase (biphasic) fluid. Heat leaking into the coolant flow space 540 or generated within the TIJ 530 will cause the temperature of the two-phase fluid to increase until it reaches the boiling point of the liquid coolant at the local pressure in the coolant flow space 540. Consequently, the coolant liquid in the coolant flow space 540 will boil and maintain the cooled region at the local pressure-dependent boiling temperature (or "saturation temperature") of the coolant if enough coolant is present. As an example, when the coolant is liquid nitrogen and the coolant flow space 540 is at atmospheric pressure, the saturation temperature is approximately −196° C. (77K).

In an alternative implementation of the conductor assembly 500 of FIG. 5, liquid coolant may flow in the coolant flow space 540 and enter the spray tube 570 via the plurality of pores or orifices (e.g., at the specified intervals). During operation of the conductor assembly 500, heat is transferred to the spray tube 570 from the liquid coolant in the coolant flow space 540, via conduction and/or convection, thereby causing the liquid coolant in the spray tube 570 to boil, in which case the spray tube 570 will carry coolant vapor at the saturation temperature. In such implementations, the flow orifice 575 can be configured to maintain a pressure difference between the coolant flow space 540 and the spray tube 570 (e.g., such that the pressure in the coolant flow space 540 is maintained substantially above the pressure in spray tube 570), and the stability of this pressure difference can help to ensure consistent and stable coolant transfer between the coolant flow space 540 and the spray tube 570.

Although shown and described with reference to FIG. 5 as being disposed within the coolant flow space 540, in other embodiments, the spray tube 570 may be disposed within the former 510 of the conductor core. In still other embodiments, the spray tube 570 may be omitted, and the former 510 may serve as a coolant/spray tube. The spray tube 570 may be configured to support, or bear, all or a portion of the tensile forces of suspension of the conductor.

In some embodiments, during operation of a conductor assembly including a coolant tube (such as the spray tube 570 of FIG. 5), vapor is generated along the entire length of the conductor assembly. In such embodiments, separate tower-mounted intermediate cooling stations may not be used within the associated power transmission system. In such embodiments, tower-mounted equipment may still be positioned at locations along the power transmission line, but the role of such tower-mounted equipment may be primarily to remove vapor from the conductor assembly and prepare it for venting, and not to generate vapor.

Figure 6A:
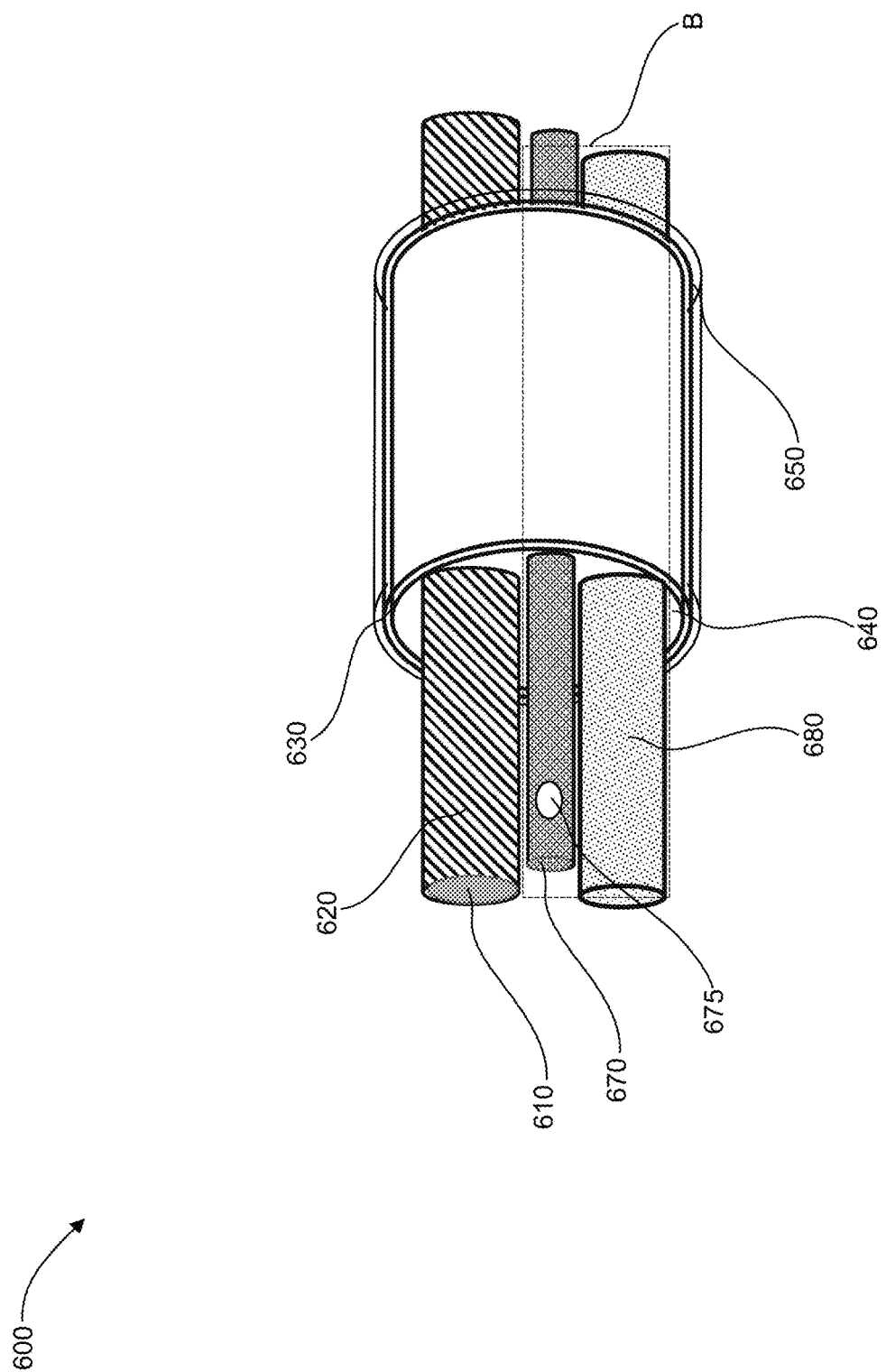
FIGS. 6A-6B illustrate a section of a conductor assembly for use in a superconducting power transmission line/system, including a coolant tube and a header tube, according to an embodiment.
Figure 6B:
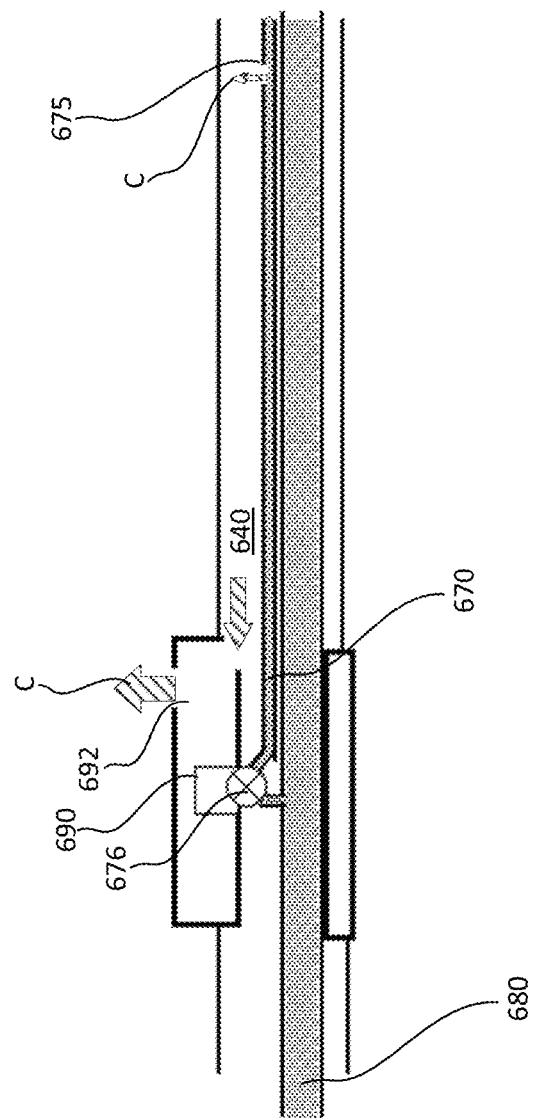

FIGS. 6A-6B show views of a section of a conductor assembly 600 for use in a superconducting OH power transmission line/system or an underground power transmission line/system, according to an embodiment. As shown, the conductor assembly 600 includes a former 610, a plurality of superconductor wires or tapes 620 wrapped around the former 610, a TIJ 630, a coolant flow space 640, a spray tube 670 with a coolant flow orifice 675, a header tube 680, a valve 676, a sensor 690, and a vent 692. In some embodiments, the conductor assembly 600 can include an external layer 650 disposed around the outside of the TIJ 630. In some embodiments, the former 610, the superconductor wires or tapes 620, the TIJ 630, the coolant flow space 640, the external layer 650, the spray tube 670, and the flow orifice 675 can be the same or substantially similar to the former 510, the superconductor wires or tapes 520, the TIJ 530, the coolant flow space 540, the external layer 550, the spray tube 570, and the coolant flow orifice 575, as described above with reference to FIG. 5. Thus, certain aspects of the former 610, the superconductor wires or tapes 620, the TIJ 630, the coolant flow space 640, the external layer 650, the spray tube 670, and the coolant flow orifice 675 are not described in greater detail herein. FIG. 6A shows a perspective view of the short section of the conductor assembly 600 while FIG. 6B shows a longitudinal cross section of portions of the conductor assembly 600 when viewed along rectangle B in FIG. 6A. The coolant is shown moving through the coolant flow space 640 along coolant lines C. In some embodiments, the coolant can move through the coolant flow space 640 as a liquid. In some embodiments, the coolant can move through the coolant flow space 640 as a gas. In some embodiments, the coolant can move through the coolant flow space 640 as both a liquid and a gas. In some embodiments, the coolant can move through the flow space 640 as a vapor. In some embodiments, the coolant can move through the flow space 640 as a liquid and a vapor. In some embodiments, the coolant can move through the flow space 640 as a vapor and a gas. In some embodiments, the coolant can move through the flow space 640 as a liquid, a vapor, and a gas.

In some embodiments, the header tube 680 can include flowing liquid coolant and can be connected to the spray tube 670 at intervals along the length of the conductor assembly 600. In some embodiments, the header tube 680 can allow for control of liquid pressure within the spray tube 670. This can allow for control of coolant flow through any of the coolant flow orifice 675. In some embodiments, the sensor 690 and the valve 676 can control admission of liquid coolant from the header tube 680 into the spray tube 670. In some embodiments, the sensor 690 can detect an oversupply of liquid coolant in the coolant flow space 640 and/or the spray tube 670 and can accordingly adjust the valve 676. In some embodiments, the header tube 680 and/or the spray tube 670 can be inside the former 610. In some embodiments, the header tube 680 and/or the spray tube 670 can be a part of the former 610. In some embodiments, the header tube 680 can function as the former 610. In other words, superconductor wires or tapes 620 can be wrapped around the header tube 680. In some embodiments, the spray tube 670 can function as the former 610. In other words, the superconductor wires or tapes 620 can be wrapped around the spray tube 670. In some embodiments, the header tube 680 and/or the spray tube 670 can support part or all of the tensile forces incident upon the conductor assembly 600.

In some embodiments, the conductor assembly 600 can include multiple sensors 690 and/or vents 692. In some embodiments, the sensors 690 and/or the vents 692 can be placed at regular or irregular intervals along the length of the conductor assembly 600. As shown, the sensor 690 and the vent 692 located at approximately same point along the length of the conductor assembly 600. In some embodiments, the sensor 690 can be located at a different location from the vent 692 along the length of the conductor assembly 600. In some embodiments, the sensors 690 and the vents 692 can be staggered at different intervals along the length of the conductor assembly 600.

In some embodiments, a conductor assembly for transmitting power includes a former that defines a shape, a superconductor material wrapped around the former, and a TIJ disposed around and spaced apart from the superconductor material. An outer surface of the superconductor material and an inner surface of the TIJ can define an annulus or other volume through which a coolant can flow.

In some embodiments, the conductor assembly can include an external layer disposed around an outside surface of the TIJ. In some embodiments, the external layer can provide structural support to the conductor assembly.

In some embodiments, an electrical insulation layer can be disposed around the superconductor material.

In some embodiments, a coolant tube that transports a coolant can be disposed in the space. In some embodiments, the coolant tube can include a flow orifice that transfers the coolant from the coolant tube to the space. In some embodiments, the flow orifice can include a series of pores. In some embodiments, the flow orifice can include an impeder (e.g., a valve) configured to regulate flow of fluid through the flow orifice. In some embodiments, a header tube can be fluidically coupled to the coolant tube. In some embodiments, the conductor assembly can include a sensor and a valve that regulate flow of coolant between the header tube and the coolant tube.

In some embodiments, a conductor assembly for transmitting power can include a superconducting wire and/or a superconducting tape wound around an outside surface of a forming device, such that the superconducting wire and/or the superconducting tape conforms to the shape of the forming device. The conductor assembly can further include a TIJ disposed around an outside edge of the superconducting wire and/or the superconducting tape, defining a coolant flow space that allows flow of a coolant through the conductor assembly.

In some embodiments, the conductor assembly can further include a layer of metal material disposed around an outside surface of the TIJ. In some embodiments, the layer of metal material can provide structural support for the conductor assembly.

In some embodiments, the conductor assembly can include an electrical insulation layer disposed around the outside surface of the TIJ.

In some embodiments, an electrical insulation layer can be disposed around the superconducting wire and/or the superconducting tape.

In some embodiments, a coolant tube can be disposed in the coolant flow space. In some embodiments, the coolant tube can transport the coolant. In some embodiments, the coolant tube can include a flow orifice configured to limit coolant flow from the coolant tube to the coolant flow space.

In some embodiments, a conductor assembly for transmitting power can include a TIJ with an interior surface, a forming device disposed inside the TIJ, and a superconducting material disposed around an outside surface of the forming device, the superconducting material conforming to a shape of the forming device. In some embodiments, the superconducting material and the interior surface of the TIJ can define an annular region that allows flow of a coolant.

In some embodiments, the forming device can be hollow to allow passage of fluid.

In some embodiments, a layer of metal material can be disposed around an outside surface of the TIJ. In some embodiments, the layer of metal material can provide structural support for the conductor assembly.

In some embodiments, the conductor assembly can include an electrical insulation layer disposed around the superconducting material.

In some embodiments, a coolant tube can be disposed in the annular region. In some embodiments, the coolant tube can transport coolant.

Embodiments described herein can include a conductor capable of suspension aboveground. In some embodiments, the conductor can include a conductor core with superconducting wires or tapes and a space for coolant flow.

In some embodiments, the conductor core can include a former, with the superconductor wire or tape wound or assembled on the former.

In some embodiments, the former can be hollow to allow passage of fluid along the conductor core. In some embodiments, the fluid can include a gas, a liquid, a vapor, or any combination thereof.

In some embodiments, the former can be porous to allow passage of fluid into and out of the conductor core.

In some embodiments, the former can be constructed to withstand mechanical forces of suspension incident on the conductor.

In some embodiments, a TIJ can be disposed around the outside of the superconductor wire or tape. In some embodiments, the TIJ can be at the same voltage as the conductor core or a connected power line. In some embodiments, the TIJ can have the same or substantially similar thermal contraction to the conductor core. In some embodiments, the TIJ can include discrete semi-rigid sections. In some embodiments, a continuous tube can be disposed around the outside of the TIJ. In some embodiments, the continuous tube can be at the same voltage as the power line and the conductor core. In some embodiments, the continuous tube can contain flowing fluid at or above atmospheric pressure.

In some embodiments, the continuous tube can be at the same or substantially similar voltage as the power line and the conductor core. In some embodiments, the continuous tube can have the same or substantially similar thermal contraction to the conductor core. In some embodiments, the continuous tube can provide mechanical support for the conductor.

In some embodiments, the conductor core can be enclosed in an electrically insulating material. In some embodiments, the electrically insulating material can be enclosed within one or more shield layers of conducting or superconducting materials. In some embodiments, the shield layers can be electrically connected or electrically active to carry electrical current.

In some embodiments, the electrical current in the shield layers can be controlled to change the electrical impedance of the power line.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A conductor assembly for transmitting power, comprising:
    a former configured to define a shape;
    a superconductor material disposed around the former;
    a thermally insulating jacket disposed around and spaced apart from the superconductor material such that an outer surface of the superconductor material and an inner surface of the thermally insulating jacket define an annulus through which a coolant can flow; and
    a coolant tube disposed in the conductor assembly and configured to transport the coolant, the coolant tube including an orifice configured to limit coolant flow out of the coolant tube,
    wherein the coolant transitions from a subcooled single-phase liquid to a gas as the coolant flows through the orifice.

2. The conductor assembly of claim 1, wherein the coolant tube is disposed in the former.

3. The conductor assembly of claim 1, further comprising:
    a cable disposed within the thermally insulating jacket and configured to provide structural support to the conductor assembly.

4. The conductor assembly of claim 1, further comprising:
    a tube disposed within the thermally insulating jacket and configured to provide structural support to the conductor assembly.

5. The conductor assembly of claim 1, further comprising:
    an electrical insulation layer disposed around the thermally insulating jacket.

6. The conductor assembly of claim 1, further comprising:
    an electrical insulation layer disposed around the superconductor material.

7. The conductor assembly of claim 1, wherein the flow orifice includes a series of pores.

8. The conductor assembly of claim 1, further comprising:
    a header tube fluidically coupled to the coolant tube.

9. The conductor assembly of claim 8, further comprising:
    a valve configured to regulate flow of coolant between the header tube and the coolant tube.

10. The conductor assembly of claim 9, further comprising a sensor configured to adjust the valve in response to detecting an oversupply of liquid coolant in one of the annulus or the coolant tube.

11. A conductor assembly for transmitting power, comprising:
    a superconducting material including at least one of a superconducting wire or a superconducting tape, disposed around an outside surface of a forming device, such that the superconducting material conforms to the shape of the forming device;
    a thermally insulating jacket disposed around and spaced apart from the superconducting material, the thermally insulating jacket and the superconducting material defining an annulus that is configured to accommodate a coolant flow through the conductor assembly; and
    a coolant tube disposed in the conductor assembly and configured to transport the coolant, the coolant tube including an orifice configured to limit coolant flow from the coolant tube,
    wherein the coolant flows through the orifice as a bi-phasic liquid.

12. The conductor assembly of claim 11, wherein the coolant tube is disposed in the former, thereby forming a vapor space between an outer surface of the coolant tube and an inner surface of the former.

13. The conductor assembly of claim 11, further comprising:
    a cable disposed within the thermally insulating jacket and configured to provide structural support to the conductor assembly.

14. The conductor assembly of claim 11, wherein the thermally insulating jacket is configured to provide structural support to the conductor assembly.

15. The conductor assembly of claim 11, further comprising:
    a tube disposed within the thermally insulating jacket and configured to provide structural support to the conductor assembly.

16. The conductor assembly of claim 11, wherein the conductor assembly has a warm dielectric configuration, the conductor assembly further comprising an electrical insulation layer disposed around the thermally insulating jacket.

17. The conductor assembly of claim 11, further comprising an electrical insulation layer disposed around the superconducting material.

18. The conductor assembly of claim 11, further comprising:
    a former disposed in the superconducting material.

19. The conductor assembly of claim 11, further comprising:
    a header tube fluidically coupled to the coolant tube.

20. The conductor assembly of claim 19, further comprising:
    a valve configured to regulate flow of coolant between the header tube and the coolant tube.

21. A conductor assembly for transmitting power, comprising:
    a thermally insulating jacket having an interior surface;
    a forming device disposed inside and spaced apart from the thermally insulating jacket;
    a superconducting material disposed around an outside surface of the forming device, the superconducting material conforming to a shape of the forming device, the superconducting material and the interior surface of the thermally insulating jacket defining an annular region through which a coolant can flow; and a coolant tube disposed in the former and configured to transport the coolant, the coolant tube including an orifice and configured to limit coolant flow from the coolant tube, wherein the coolant transitions from a subcooled single-phase liquid to a gas as the coolant flows through the orifice.

22. The conductor assembly of claim 21, wherein a vapor space is formed between an outer surface of the coolant tube and an inner surface of the former.

23. The conductor assembly of claim 21, further comprising:

a cable disposed within the thermally insulating jacket and configured to provide structural support to the conductor assembly.

24. The conductor assembly of claim 21, wherein the thermally insulating jacket is configured to provide structural support to the conductor assembly.

25. The conductor assembly of claim 21, further comprising:

a tube disposed within the thermally insulating jacket and configured to provide structural support to the conductor assembly.

26. The conductor assembly of claim 21, further comprising an electrical insulation layer disposed around the thermally insulating jacket.

27. The conductor assembly of claim 21, further comprising an electrical insulation layer disposed around the superconducting material.

28. The conductor assembly of claim 21, wherein the forming device is hollow to allow passage of fluid.

29. The conductor assembly of claim 21, further comprising:

a header tube fluidically coupled to the coolant tube.

30. The conductor assembly of claim 29, further comprising:

a valve configured to regulate flow of coolant between the header tube and the coolant tube.

* * * * *